(12) United States Patent
Rosenflanz

(10) Patent No.: US 8,003,217 B2
(45) Date of Patent: Aug. 23, 2011

(54) METAL OXIDE CERAMIC AND METHOD OF MAKING ARTICLES THEREWITH

(75) Inventor: Anatoly Z. Rosenflanz, Maplewood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 11/623,129

(22) Filed: Jan. 15, 2007

(65) Prior Publication Data

US 2007/0135290 A1     Jun. 14, 2007

Related U.S. Application Data

(63) Continuation of application No. 10/211,491, filed on Aug. 2, 2002, which is a continuation-in-part of application No. 09/922,526, filed on Aug. 2, 2001, now abandoned.

(51) Int. Cl.
  *B32B 17/00*   (2006.01)
  *C03C 3/068*   (2006.01)

(52) U.S. Cl. ........ 428/426; 428/688; 428/697; 428/701; 501/2; 501/73; 501/77; 501/78

(58) Field of Classification Search ............... 428/688, 428/432, 433, 426, 697, 701; 501/63, 64, 501/67, 77, 78; 252/301

See application file for complete search history.

(56) References Cited

U.S. PATENT DOCUMENTS

| | | |
|---|---|---|
| 659,926 A | 10/1900 | Jacobs |
| 906,339 A | 12/1908 | Tone |
| 960,712 A | 6/1910 | Saunders |
| 1,037,999 A | 9/1912 | Saunders |
| 1,107,011 A | 8/1914 | Allen |
| 1,149,064 A | 8/1915 | Kalmus |
| 1,161,620 A | 11/1915 | Coulter |
| 1,192,709 A | 7/1916 | Tone |
| 1,240,490 A | 9/1917 | Saunders et al. |
| 1,247,337 A | 11/1917 | Saunders et al. |
| 1,257,356 A | 2/1918 | Hutchins |
| 1,263,708 A | 4/1918 | Saunders et al. |
| 1,263,709 A | 4/1918 | Saunders et al. |
| 1,263,710 A | 4/1918 | Saunders et al. |

(Continued)

FOREIGN PATENT DOCUMENTS

AT     333146     10/1976

(Continued)

OTHER PUBLICATIONS

Lee et al. (J. Am. Ceram. Soc, 90 [8] 2589-2594 (2007)).*

(Continued)

*Primary Examiner* — Timothy Speer
*Assistant Examiner* — Lauren Robinson
(74) *Attorney, Agent, or Firm* — Elizabeth A. Gallo

(57) ABSTRACT

Disclosed herein is a ceramic comprising: at least two different metal oxides, the at least two different metal oxides comprising $TiO_2$ and $La_2O_3$ or $TiO_2$ and BaO; less than 20% by weight $SiO_2$; less than 20% by weight $B_2O_3$; and less than 40% by weight $P_2O_5$; the ceramic having a glass transition temperature, $T_g$, and a crystallization onset temperature, $T_x$, and the difference between $T_g$ and $T_x$ is at least 5K. The ceramic may comprise additional metal oxides. Also disclosed herein is a method of making an article using the ceramic; typically, the ceramic is heated above the $T_g$, shaped, and then cooled.

8 Claims, 6 Drawing Sheets

U.S. PATENT DOCUMENTS

| | | |
|---|---|---|
| 1,268,532 A | 6/1918 | Allen |
| 1,268,533 A | 6/1918 | Allen |
| 1,314,061 A | 8/1919 | Harrison |
| 1,339,344 A | 5/1920 | Hutchins |
| 1,402,714 A | 1/1922 | Brockbank |
| 1,448,586 A | 3/1923 | Allen |
| 1,768,561 A | 7/1930 | Blatti |
| 1,910,444 A | 5/1933 | Nicholson |
| 2,000,857 A | 5/1935 | Masin |
| 2,206,081 A | 7/1940 | Eberlin |
| 2,424,645 A | 7/1947 | Baumann, Jr. et al. |
| 2,618,567 A | 11/1952 | Comstock, Ill |
| 2,805,166 A | 9/1957 | Loffler |
| 2,958,593 A | 11/1960 | Hoover et al. |
| 2,961,296 A | 11/1960 | Fenerty |
| 3,041,156 A | 6/1962 | Rowse et al. |
| 3,141,747 A | 7/1964 | Marshall |
| 3,149,016 A * | 9/1964 | Tung et al. .................... 428/402 |
| 3,174,871 A | 3/1965 | Geffcken et al. |
| 3,181,939 A | 5/1965 | Marshall et al. |
| 3,216,794 A | 11/1965 | Roschuk |
| 3,377,660 A | 4/1968 | Marshall et al. |
| 3,419,403 A | 12/1968 | Searight et al. |
| 3,493,403 A * | 2/1970 | Beck et al. ...................... 501/34 |
| 3,498,769 A | 3/1970 | Coes, Jr. |
| 3,519,448 A | 7/1970 | Alper et al. |
| 3,560,074 A * | 2/1971 | Searight et al. ............... 359/541 |
| 3,625,717 A | 12/1971 | Grubba et al. |
| 3,635,739 A | 1/1972 | MacDowell et al. |
| 3,637,361 A | 1/1972 | Kita et al. |
| 3,646,713 A | 3/1972 | Marshall et al. |
| 3,650,780 A | 3/1972 | Connelly |
| 3,714,059 A | 1/1973 | Shaw et al. |
| 3,717,583 A | 2/1973 | Shaw et al. |
| 3,726,621 A | 4/1973 | Cichy |
| 3,754,978 A | 8/1973 | Elmer et al. |
| 3,781,172 A | 12/1973 | Pett et al. |
| 3,792,553 A | 2/1974 | Schleifer et al. |
| 3,819,352 A | 6/1974 | Pei |
| 3,859,407 A | 1/1975 | Blanding et al. |
| 3,881,282 A | 5/1975 | Watson |
| 3,888,691 A | 6/1975 | Villani et al. |
| 3,891,408 A | 6/1975 | Rowse et al. |
| 3,893,826 A | 7/1975 | Quinan et al. |
| 3,916,584 A | 11/1975 | Howard et al. |
| 3,926,603 A | 12/1975 | Plesslinger et al. |
| 3,928,515 A | 12/1975 | Richmond et al. |
| 3,940,276 A | 2/1976 | Wilson |
| 3,946,130 A | 3/1976 | Tung et al. |
| 3,947,281 A | 3/1976 | Bacon |
| 3,973,977 A | 8/1976 | Wilson |
| 3,996,702 A | 12/1976 | Leahy |
| 4,014,122 A | 3/1977 | Woods |
| 4,035,162 A | 7/1977 | Brothers et al. |
| 4,049,397 A | 9/1977 | Bockstiegel et al. |
| 4,059,417 A | 11/1977 | Ilmaier et al. |
| 4,070,796 A | 1/1978 | Scott |
| 4,073,096 A | 2/1978 | Ueltz et al. |
| 4,111,668 A | 9/1978 | Walker et al. |
| 4,111,707 A | 9/1978 | Komorita et al. |
| 4,120,677 A * | 10/1978 | Burn ............................. 264/615 |
| 4,122,042 A | 10/1978 | Meden-Piesslinger et al. |
| 4,126,429 A | 11/1978 | Watson |
| 4,140,494 A | 2/1979 | Coes, Jr. |
| 4,157,898 A | 6/1979 | Walker et al. |
| 4,166,746 A | 9/1979 | Ishibashi et al. |
| 4,182,437 A | 1/1980 | Roberts et al. |
| 4,194,887 A | 3/1980 | Ueltz et al. |
| 4,217,264 A | 8/1980 | Mabie et al. |
| 4,218,253 A | 8/1980 | Dworak et al. |
| 4,238,213 A | 12/1980 | Pallo et al. |
| 4,261,706 A | 4/1981 | Blanding et al. |
| 4,311,489 A | 1/1982 | Kressner |
| 4,314,827 A | 2/1982 | Leitheiser et al. |
| 4,316,964 A | 2/1982 | Lange |
| 4,328,318 A | 5/1982 | Miranday et al. |
| 4,341,533 A | 7/1982 | Daire et al. |
| 4,366,253 A * | 12/1982 | Yagi ................................. 501/63 |
| RE31,128 E | 1/1983 | Walker et al. |
| 4,405,545 A | 9/1983 | Septier et al. |
| 4,415,510 A | 11/1983 | Richmond |
| 4,439,845 A | 3/1984 | Geohegan, Jr. et al. |
| 4,457,767 A | 7/1984 | Poon et al. |
| 4,467,767 A | 8/1984 | Kampichler et al. |
| 4,472,511 A | 9/1984 | Mennemann et al. |
| RE31,725 E | 11/1984 | Walker et al. |
| 4,489,022 A | 12/1984 | Robyn et al. |
| 4,518,397 A | 5/1985 | Leitheiser et al. |
| 4,530,909 A | 7/1985 | Makishima et al. |
| 4,543,107 A | 9/1985 | Rue |
| 4,552,199 A | 11/1985 | Onoyama et al. |
| 4,584,279 A * | 4/1986 | Grabowski et al. ............. 501/78 |
| 4,588,419 A | 5/1986 | Caul et al. |
| 4,595,663 A | 6/1986 | Krohn et al. |
| 4,623,364 A | 11/1986 | Cottringer et al. |
| 4,652,275 A | 3/1987 | Bloecher et al. |
| 4,705,656 A | 11/1987 | Onoyama et al. |
| 4,734,104 A | 3/1988 | Broberg |
| 4,737,163 A | 4/1988 | Larkey |
| 4,740,403 A | 4/1988 | Oomen et al. |
| 4,741,743 A | 5/1988 | Narayanan et al. |
| 4,744,802 A | 5/1988 | Schwabel |
| 4,751,137 A | 6/1988 | Halg et al. |
| 4,752,459 A | 6/1988 | Pepper |
| 4,756,746 A | 7/1988 | Kemp, Jr. et al. |
| 4,757,036 A | 7/1988 | Kaar et al. |
| 4,762,677 A | 8/1988 | Dolgin |
| 4,770,671 A | 9/1988 | Monroe et al. |
| 4,772,511 A | 9/1988 | Wood et al. |
| 4,780,268 A | 10/1988 | Papsi et al. |
| 4,789,501 A | 12/1988 | Day et al. |
| 4,799,939 A | 1/1989 | Bloecher et al. |
| 4,800,685 A | 1/1989 | Haynes, Jr. |
| 4,812,422 A | 3/1989 | Yuhaku et al. |
| 4,829,031 A | 5/1989 | Roy et al. |
| 4,881,951 A | 11/1989 | Wood et al. |
| 4,898,587 A | 2/1990 | Mera |
| 4,898,597 A | 2/1990 | Hay et al. |
| 4,950,294 A | 8/1990 | Hakamatsuka |
| 4,960,441 A | 10/1990 | Pellow et al. |
| 4,997,461 A | 3/1991 | Markhoff-Matheny et al. |
| 5,007,943 A | 4/1991 | Kelly et al. |
| 5,009,675 A | 4/1991 | Kunz et al. |
| 5,009,676 A | 4/1991 | Rue et al. |
| 5,011,508 A | 4/1991 | Wald et al. |
| 5,013,696 A | 5/1991 | Greskovich et al. |
| 5,023,212 A | 6/1991 | Dubots et al. |
| 5,038,453 A | 8/1991 | Kurita et al. |
| 5,042,991 A | 8/1991 | Kunz et al. |
| 5,045,402 A | 9/1991 | Adams, Jr. et al. |
| 5,057,018 A | 10/1991 | Bowen |
| 5,071,801 A | 12/1991 | Bedard et al. |
| 5,077,246 A | 12/1991 | Weaver et al. |
| 5,085,671 A | 2/1992 | Martin et al. |
| 5,090,968 A | 2/1992 | Pellow |
| 5,094,672 A | 3/1992 | Giles, Jr. et al. |
| 5,094,711 A | 3/1992 | Narasimhan et al. |
| 5,104,319 A | 4/1992 | Evans et al. |
| 5,104,830 A | 4/1992 | Drouet et al. |
| 5,108,477 A | 4/1992 | Cornelius et al. |
| 5,110,332 A | 5/1992 | Isaksson |
| 5,118,326 A | 6/1992 | Lee et al. |
| 5,122,176 A | 6/1992 | Goettler |
| 5,131,926 A | 7/1992 | Rostoker et al. |
| 5,139,978 A | 8/1992 | Wood |
| 5,143,522 A | 9/1992 | Gibson et al. |
| 5,152,917 A | 10/1992 | Pieper et al. |
| 5,164,348 A | 11/1992 | Wood |
| 5,185,299 A | 2/1993 | Wood et al. |
| 5,194,072 A | 3/1993 | Rue et al. |
| 5,201,916 A | 4/1993 | Berg et al. |
| 5,203,884 A | 4/1993 | Buchanan et al. |
| 5,203,886 A | 4/1993 | Sheldon et al. |
| 5,213,591 A | 5/1993 | Celikkaya et al. |
| 5,215,563 A | 6/1993 | LaCourse et al. |
| 5,227,104 A | 7/1993 | Bauer |
| 5,248,318 A | 9/1993 | Tamamaki et al. |

| Patent No. | Date | Inventor |
|---|---|---|
| 5,259,147 A | 11/1993 | Falz et al. |
| 5,273,566 A | 12/1993 | Balcar et al. |
| 5,282,875 A | 2/1994 | Wood et al. |
| 5,298,332 A | 3/1994 | Andrus et al. |
| 5,312,789 A | 5/1994 | Wood |
| 5,336,280 A | 8/1994 | Dubots et al. |
| 5,348,914 A | 9/1994 | Thometzek et al. |
| 5,352,254 A | 10/1994 | Celikkaya |
| 5,366,523 A | 11/1994 | Rowenhorst et al. |
| 5,372,620 A | 12/1994 | Rowse et al. |
| 5,376,470 A | 12/1994 | Sprouse |
| 5,378,251 A | 1/1995 | Culler et al. |
| 5,378,662 A | 1/1995 | Tsuyuki |
| 5,395,407 A | 3/1995 | Cottringer et al. |
| 5,413,974 A | 5/1995 | Yokoyama et al. |
| 5,417,726 A | 5/1995 | Stout et al. |
| 5,427,595 A | 6/1995 | Pihl et al. |
| 5,429,647 A | 7/1995 | Larmie |
| 5,431,704 A | 7/1995 | Tamamaki et al. |
| 5,436,063 A | 7/1995 | Follett et al. |
| 5,443,906 A | 8/1995 | Pihl et al. |
| 5,449,389 A | 9/1995 | Yoshizumi et al. |
| 5,468,694 A | 11/1995 | Taguchi et al. |
| 5,484,752 A | 1/1996 | Waku et al. |
| 5,496,386 A | 3/1996 | Broberg et al. |
| 5,498,269 A | 3/1996 | Larmie |
| 5,516,348 A | 5/1996 | Conwell et al. |
| 5,520,711 A | 5/1996 | Helmin |
| 5,534,843 A | 7/1996 | Tsunoda et al. |
| 5,547,479 A | 8/1996 | Conwell et al. |
| 5,549,962 A | 8/1996 | Holmes et al. |
| 5,551,963 A | 9/1996 | Larmie |
| 5,552,213 A | 9/1996 | Eschner |
| 5,569,547 A | 10/1996 | Waku et al. |
| 5,593,467 A | 1/1997 | Monroe |
| 5,605,870 A | 2/1997 | Strom-Olsen et al. |
| 5,609,706 A | 3/1997 | Benedict et al. |
| 5,611,829 A | 3/1997 | Monroe et al. |
| 5,641,469 A | 6/1997 | Garg et al. |
| 5,643,840 A | 7/1997 | Hikata et al. |
| 5,645,619 A | 7/1997 | Erickson et al. |
| 5,648,302 A * | 7/1997 | Brow et al. .................. 501/50 |
| 5,651,925 A | 7/1997 | Ashley et al. |
| 5,653,775 A | 8/1997 | Plovnick et al. |
| 5,665,127 A | 9/1997 | Moltgen et al. |
| 5,679,067 A | 10/1997 | Johnson et al. |
| 5,682,082 A | 10/1997 | Wei et al. |
| 5,689,374 A | 11/1997 | Xu et al. |
| 5,693,239 A | 12/1997 | Wang et al. |
| 5,716,706 A | 2/1998 | Morris |
| 5,721,188 A | 2/1998 | Sung et al. |
| 5,725,162 A | 3/1998 | Garg et al. |
| 5,733,178 A | 3/1998 | Ohishi |
| 5,733,564 A | 3/1998 | Lehtinen |
| 5,738,696 A | 4/1998 | Wu |
| 5,744,243 A | 4/1998 | Li et al. |
| 5,747,397 A * | 5/1998 | McPherson et al. ............. 501/51 |
| 5,763,345 A | 6/1998 | Ohshima et al. |
| 5,782,940 A | 7/1998 | Jayan et al. |
| 5,804,513 A | 9/1998 | Sakatani et al. |
| 5,811,361 A | 9/1998 | Miwa |
| 5,827,791 A | 10/1998 | Pauliny et al. |
| 5,847,865 A | 12/1998 | Gopinath et al. |
| 5,851,939 A | 12/1998 | Miwa |
| 5,856,254 A | 1/1999 | Feige et al. |
| 5,863,308 A | 1/1999 | Qi et al. |
| 5,876,470 A | 3/1999 | Abrahamson |
| 5,902,763 A | 5/1999 | Waku et al. |
| 5,903,951 A | 5/1999 | Ionta et al. |
| 5,952,256 A | 9/1999 | Morishita et al. |
| 5,954,844 A | 9/1999 | Law et al. |
| 5,961,674 A | 10/1999 | Gagliardi et al. |
| 5,975,988 A | 11/1999 | Christianson |
| 5,976,274 A | 11/1999 | Inoue et al. |
| 5,981,413 A | 11/1999 | Hale |
| 5,981,415 A | 11/1999 | Waku et al. |
| 6,053,956 A | 4/2000 | Wood |
| 6,054,093 A | 4/2000 | Torre, Jr. et al. |
| 6,123,743 A | 9/2000 | Carman et al. |
| 6,128,430 A | 10/2000 | Chu et al. |
| 6,146,244 A | 11/2000 | Atsugi et al. |
| 6,187,702 B1 | 2/2001 | Morishita |
| 6,214,429 B1 | 4/2001 | Zou et al. |
| 6,214,471 B1 | 4/2001 | Beall et al. |
| 6,245,700 B1 * | 6/2001 | Budd et al. .................. 501/34 |
| 6,251,813 B1 | 6/2001 | Sato |
| 6,254,981 B1 | 7/2001 | Castle |
| 6,268,303 B1 | 7/2001 | Aitken et al. |
| 6,277,161 B1 | 8/2001 | Castro et al. |
| 6,287,353 B1 | 9/2001 | Celikkaya |
| 6,306,926 B1 | 10/2001 | Bretscher et al. |
| 6,329,309 B1 | 12/2001 | Kanamaru et al. |
| 6,335,083 B1 | 1/2002 | Kasai et al. |
| 6,355,586 B1 * | 3/2002 | Usui et al. .................. 501/45 |
| 6,361,414 B1 | 3/2002 | Ravkin et al. |
| 6,362,119 B1 | 3/2002 | Chiba |
| 6,447,937 B1 | 9/2002 | Murakawa et al. |
| 6,451,077 B1 | 9/2002 | Rosenflanz |
| 6,454,822 B1 | 9/2002 | Rosenflanz |
| 6,458,731 B1 | 10/2002 | Rosenflanz |
| 6,461,988 B2 | 10/2002 | Budd et al. |
| 6,469,825 B1 | 10/2002 | Digonnet et al. |
| 6,482,758 B1 | 11/2002 | Weber et al. |
| 6,482,761 B1 | 11/2002 | Watanabe et al. |
| 6,484,539 B1 | 11/2002 | Nordine et al. |
| 6,485,622 B1 * | 11/2002 | Fu .................. 204/421 |
| 6,490,081 B1 | 12/2002 | Feillens et al. |
| 6,511,739 B2 | 1/2003 | Kasai et al. |
| 6,514,892 B1 | 2/2003 | Kasai et al. |
| 6,521,004 B1 | 2/2003 | Culler et al. |
| 6,582,488 B1 | 6/2003 | Rosenflanz |
| 6,583,080 B1 | 6/2003 | Rosenflanz |
| 6,589,305 B1 | 7/2003 | Rosenflanz |
| 6,592,640 B1 | 7/2003 | Rosenflanz et al. |
| 6,596,041 B2 | 7/2003 | Rosenflanz |
| 6,607,570 B1 | 8/2003 | Rosenflanz et al. |
| 6,620,214 B2 | 9/2003 | McArdle et al. |
| 6,666,750 B1 | 12/2003 | Rosenflanz |
| 6,667,261 B1 | 12/2003 | Anshits et al. |
| 6,669,749 B1 | 12/2003 | Rosenflanz et al. |
| 6,706,083 B1 | 3/2004 | Rosenflanz |
| 6,749,653 B2 | 6/2004 | Castro et al. |
| 6,818,578 B2 | 11/2004 | Tachiwana |
| 6,833,014 B2 | 12/2004 | Welygan et al. |
| 6,878,456 B2 | 4/2005 | Castro et al. |
| 6,881,483 B2 | 4/2005 | McArdle et al. |
| 6,984,261 B2 | 1/2006 | Cummings |
| 7,101,819 B2 | 9/2006 | Rosenflanz et al. |
| 7,141,522 B2 | 11/2006 | Rosenflanz et al. |
| 7,141,523 B2 | 11/2006 | Rosenflanz et al. |
| 7,147,544 B2 | 12/2006 | Rosenflanz |
| 7,325,943 B2 | 2/2008 | Benoit et al. |
| 2001/0030811 A1 | 10/2001 | Kasai et al. |
| 2002/0066233 A1 | 6/2002 | McArdle et al. |
| 2002/0160694 A1 | 10/2002 | Wood et al. |
| 2003/0039771 A1 | 2/2003 | Hachitani et al. |
| 2003/0040423 A1 | 2/2003 | Harada et al. |
| 2003/0110706 A1 | 6/2003 | Rosenflanz |
| 2003/0110707 A1 | 6/2003 | Rosenflanz et al. |
| 2003/0110708 A1 | 6/2003 | Rosenflanz |
| 2003/0110709 A1 | 6/2003 | Rosenflanz et al. |
| 2003/0115805 A1 | 6/2003 | Rosenflanz et al. |
| 2003/0126802 A1 | 7/2003 | Rosenflanz |
| 2003/0126803 A1 | 7/2003 | Rosenflanz |
| 2004/0020245 A1 | 2/2004 | Rosenflanz et al. |
| 2004/0023078 A1 | 2/2004 | Rosenflanz et al. |
| 2004/0148868 A1 | 8/2004 | Anderson et al. |
| 2004/0148870 A1 | 8/2004 | Celikkaya et al. |
| 2004/0148966 A1 | 8/2004 | Celikkaya et al. |
| 2004/0148967 A1 | 8/2004 | Celikkaya et al. |
| 2004/0213539 A1 | 10/2004 | Anderson et al. |
| 2005/0037076 A1 | 2/2005 | Burnside et al. |
| 2005/0056055 A1 | 3/2005 | Celikkaya et al. |
| 2005/0060948 A1 | 3/2005 | Rosenflanz |
| 2005/0075233 A1 | 4/2005 | Weber et al. |
| 2005/0132655 A1 | 6/2005 | Anderson et al. |
| 2005/0132656 A1 | 6/2005 | Anderson et al. |
| 2005/0132657 A1 | 6/2005 | Celikkaya et al. |

| | | | |
|---|---|---|---|
| 2005/0132658 A1 | 6/2005 | Celikkaya et al. | |
| 2005/0133974 A1 | 6/2005 | Celikkaya et al. | |
| 2005/0137077 A1 | 6/2005 | Bange et al. | |
| 2005/0137078 A1 | 6/2005 | Anderson et al. | |
| 2005/0183456 A1 | 8/2005 | Taplan et al. | |
| 2005/0243570 A1 | 11/2005 | Chaves et al. | |
| 2006/0021285 A1 | 2/2006 | Rosenflanz et al. | |
| 2006/0022385 A1 | 2/2006 | Rosenflanz | |
| 2006/0189473 A1 | 8/2006 | Endo | |
| 2007/0015651 A1 | 1/2007 | Endo | |
| 2007/0064417 A1 | 3/2007 | Hatanaka et al. | |
| 2007/0249482 A1 | 10/2007 | Rosenflanz | |

FOREIGN PATENT DOCUMENTS

| | | |
|---|---|---|
| CN | 86 1 06629 A | 4/1988 |
| CN | 1107811 A | 9/1995 |
| CN | 1281788 A | 1/2001 |
| CN | 1287990 A | 3/2001 |
| DE | 20 34 011 | 7/1970 |
| DE | 134 638 A | 3/1979 |
| DE | 141 420 | 4/1980 |
| DE | 3534575 | 4/1986 |
| EP | 0 200 487 | 11/1986 |
| EP | 0 227 374 | 7/1987 |
| EP | 0 236 507 | 9/1987 |
| EP | 0 291 029 A1 | 11/1988 |
| EP | 0 408 771 A1 | 1/1991 |
| EP | 0 469 271 | 2/1992 |
| EP | 0 480 678 A1 | 4/1992 |
| EP | 0 494 638 | 7/1992 |
| EP | 0 495 536 A2 | 7/1992 |
| EP | 0 579 281 A1 | 1/1994 |
| EP | 0 601 453 A2 | 6/1994 |
| EP | 0 647 601 A1 | 4/1995 |
| EP | 0 666 238 B1 | 8/1995 |
| EP | 0 666 239 B1 | 8/1995 |
| EP | 0 709 347 | 5/1996 |
| EP | 0 722 919 A1 | 7/1996 |
| EP | 0 291 029 B2 | 11/1996 |
| FR | 1547989 | 10/1968 |
| FR | 2 118 026 | 7/1972 |
| FR | 2538370 | 6/1984 |
| FR | 2 609 708 | 7/1988 |
| GB | 793503 | 4/1958 |
| GB | 1005338 | 9/1965 |
| GB | 1 121 875 | 7/1968 |
| GB | 1 233 512 | 5/1971 |
| GB | 1 260 933 A | 1/1972 |
| GB | 1 411 398 | 10/1975 |
| GB | 2 116 992 | 10/1983 |
| JP | 50025608 | 3/1975 |
| JP | 59-13647 | 1/1984 |
| JP | 59 227726 A | 12/1984 |
| JP | 60-33229 | 2/1985 |
| JP | 60221338 | 11/1985 |
| JP | 61099665 | 5/1986 |
| JP | 62-003041 | 1/1987 |
| JP | 63-156024 | 6/1988 |
| JP | 63-225548 | 9/1988 |
| JP | 63-303821 | 12/1988 |
| JP | 02-092835 | 4/1990 |
| JP | 03-113428 A | 5/1991 |
| JP | HEI 4-119941 | 4/1992 |
| JP | 05-085821 | 4/1993 |
| JP | 05-226733 A | 9/1993 |
| JP | 06 040765 A | 2/1994 |
| JP | 06-171974 | 6/1994 |
| JP | 07-069676 | 3/1995 |
| JP | 09-156953 | 6/1997 |
| JP | 09278480 | 10/1997 |
| JP | 10-208229 | 8/1998 |
| JP | 10-208244 | 8/1998 |
| JP | 10-223367 | 8/1998 |
| JP | HEI 11-189926 | 7/1999 |
| JP | 11-335136 | 12/1999 |
| JP | 200045128 A | 2/2000 |
| JP | 200045129 A | 2/2000 |
| JP | 201294480 | 10/2001 |
| JP | 2003-94414 | 4/2003 |
| KR | 96-01009 | 1/1996 |
| KR | 1996-01009 | 1/1996 |
| RU | 2002771 | 11/1993 |
| RU | 2148569 | 10/2000 |
| SU | 1217809 | 3/1986 |
| SU | 1455569 | 4/1986 |
| SU | 1455569 | 10/1986 |
| SU | 1768561 | 10/1992 |
| WO | WO 93/21120 | 10/1993 |
| WO | WO 94/14722 | 7/1994 |
| WO | WO 97/16385 | 5/1997 |
| WO | WO 97/25284 | 7/1997 |
| WO | WO 00/34201 | 6/2000 |
| WO | WO 01/16047 A2 | 3/2001 |
| WO | WO 01/23321 A1 | 4/2001 |
| WO | WO 01/23323 A1 | 4/2001 |
| WO | WO 01/27046 A1 | 4/2001 |
| WO | WO 01/56946 A | 8/2001 |
| WO | WO 01/56947 A | 8/2001 |
| WO | WO 01/56949 A | 8/2001 |
| WO | WO 01/56950 A | 8/2001 |
| WO | WO 02/08146 A | 1/2002 |

OTHER PUBLICATIONS

Abstract for "Kinetics of Nonisothermal Sintering of Some Eutectic Oxide Compositions," I. Yu Volkova et al., 1986 (abstract from Database Chemabs 'Online! Chemical Abstracts Service, Columbus, Ohio, US).

"Eutectic Precipitation of the Spinel Solid Solution-Yttrium Aluminum Garnet (YAG) System," Shuqiang Wang et al., *Journal of the American Ceramic Society*, 1998, vol. 81, No. 1, pp. 263-265.

"Microstructures of laser-treated $Al_2O_3$-$ZrO_2$-$CeO_2$ composites," Zan-Hwey Chen et al., *Materials Science & Engineering A (Structural Materials: Properties, Microstructure and Processing)*, 1995, vol. A196, No. 1-2, pp. 253-260.

"Advances in the Grinding Efficiency of Sintered Alumina Abrasives," Andreas Krell et al., *Journal of the American Ceramic Society*, 1996, vol. 79, No. 3, pp. 763-769.

"Interface modification for increased fracture toughness in reaction-formed yttrium aluminum garnet/alumina eutectic composites," Luke N. Brewer et al., *J. Materials Research*, 1999, vol. 14, No. 10, pp. 3907-3912.

Dow Jones Interactive Internet Printout on Jun. 20, 2001 for web address "http://ptg.djnr.com/ccroot/asp/publib/story.asp"; "China's Rare Earth Industry in the Doldrums", Asia Pulse, Jan. 28, 1999, 2 pages.

Dow Jones Interactive Internet Printout on Jun. 20, 2001 for web address "http://ptg.djnr.com/ccroot/asp/publib/story.asp"; "China's Rare Earth Export Quota Set at 45,000 Tons", Asia Pulse, Jan. 9, 2001, 1 page.

Dow Jones Interactive Internet Printout on Jun. 20, 2001 for web address "http://ptg.djnr.com/ccroot/asp/publib/story.asp"; "Elements: China to Impose Quotas on Rare Earth Exports", Chemical Business NewsBase, Feb. 4, 1999, 1 page.

Dow Jones Interactive Internet Printout on Jun. 20, 2001 for web address "http://ptg.djnr.com/ccroot/asp/publib/story.asp"; "Rare Earth Prices and Market Outlook", Chemical Business NewsBase, May 27, 1999, 2 pages.

Dow Jones Interactive Internet Printout on Jun. 20, 2001 for web address "http://ptg.djnr.com/ccroot/asp/publib/story.asp"; "In Asia", Engineering & Mining Journal, Feb. 28, 2000, 4 pages.

Dow Jones Interactive Internet Printout on Jun. 20, 2001 for web address "http://ptg.djnr.com/ccroot/asp/publib/story.asp"; "Rare Earths: An Industry Review and Market Outlook—Part 1", Chemical Business NewsBase, Dec. 8, 2000, 2 pages.

Dow Jones Interactive Internet Printout on Jun. 20, 2001 for web address "http://ptg.djnr.com/ccroot/asp/publib/story.asp"; "Traders' View on Chemical Business (Part 2): Rare Earth: Market Confusion Inevitable Due to China's Unstable Supply", Chemical Business NewsBase, Aug. 10, 2000, 2 pages.

"China: Oversupply Puts Rare Earths Projects on Hold", Industrial Minerals, Aug. 1997, 1 page.

"Increase in Value of Rare Earth Products Boosts Yixing Xinwei", W. Yau, South China Morning Post, Apr. 12, 2000, 2 pages.

"Rare Earth—Market Confusion Inevitable Due to China's Unstable Supply", Japan Chemical Week, vol. 41, No. 2080, Jul. 6, 2000, pp. 6-7.

"Rare Earths Prices Recover Despite China's Overcapacity", Louise Rodriquez, America Metal Market, vol. 109, No. 14, Jan. 22, 2001, p. 13.

"Prices: Minerals", Asian Ceramics & Glass, Jan. 2001, 2 pages.

"China Rare Earth Information", China Rare Earth Information Center, vol. 6, No. 4, Aug. 2000, 3 pages.

"Microstructure and Thermal Stability of $Al_2O_3/Y_3Al_5O_{12}$ (YAG) Eutectic Composite Prepared by an Arc Discharge Method", T. Isobe et al., J. Ceram. Soc. Jap., 109, [1], 2001, pp. 66-70, Abstract in English.

"Divorced Eutectic and Interface Characteristics in a Solidified YAG-Spinel Composite With Spinel-Rich Composition", S. Wang et al., J. Mat. Sci., 35, 2000, pp. 2757-2761.

"Processing, Microstructure, and Strength of Alumina-YAG Eutectic Polycrystals", Tai-Il Mah et al., J. Am. Ceram. Soc., 83, [8], 2000, pp. 2088-2090.

"Phase Identification of $Al_2O_3/RE_3Al_5O_{12}$ and $Al_2O_3/REAlO_3$ (RE = Sm-Lu, Y) Eutectics", J. Crystal Growth, 218, 2000, pp. 67-73.

"Crystallization and Thermal Properties of $Al_2O_3$-$Y_2O_3$ Melts", S. V. Stankus et al., J. Crystal Growth, 167, 1996, pp. 165-170.

Dialog © file 319: Chem Bus NewsBase © 2001 Royal Soc Chemistry. Abstract for "China: Oversupply Puts Rare Earths Projects on Hold", Industrial Minerals n 359, p. 10.

"Rare-Earth Metals", J. Hedrick, pp. 61.1-61.6, 1997.

"Rare-Earth Metal Prices in the USA ca. 1960 to 1994", J. Hedrick, J. Alloys and Compounds, 1997, pp. 471-481.

"Preliminary data on subsolidus phase equilibria in the $La_2O_3$-$Al_2O_3$-$Mn_2O_3$ and $La_2O_3$-$Al_2O_3$-$Fe_2O_3$ systems", Hrovat et al., Journal of Materials Science Letters, vol. 14, 1995, pp. 265-267.

"Aspects of Synthesis of Decorite Opacified Glass", Keramika, Glass and Ceramics, vol. 58, Nos. 1-2, pp. 8-11, Jan. 2001.

"A New Ceramic Eutectic Composite with High Strength at 1873 K", Yoshiharu Waku, Advanced Materials, vol. 10, No. 8, 1998, pp. 615-617.

"Synthesis of Y-Al Garnet", Krokhin et al., Glass and Ceramics, vol. 55, Nos. 5-6, 1998, pp. 151-152.

"High-temperature strength and thermal stability of a unidirectionally solidified $Al_2O_3$/YAG eutectic composite", Waku et al., pp. 1217-1225.

"Sapphire matrix composites reinforced with single crystal VAG phases", Waku et al., Journal of Materials Science, vol. 31, 1996, pp. 4663-4670.

"Thermo-Mechanical Stability of Directionally Solidified $Al_2O_3$-$ZrO_2(Y_2O_3)$ Eutectic Fibers", Yang and Zhu, Scripta Materialia, vol. 36, No. 8, 1997, pp. 961-965.

"A ductile ceramic eutectic composite with high strength at 1,873 K", Waku et al., Nature, vol. 389, Sep. 1997, pp. 49-52.

"The Liquidus Surface in the $Al_2O_3$-$ZrO_2$-$Y_2O_3$ Phase Diagram", Lakiza et al., Powder Metallurgy and Metal Ceramics, vol. 33, No. 11-12, 1994, pp. 595-597.

"Powder-Material Research Methods and Properties Polythermal Sections of the $Al_2O_3$-$ZrO_2$-$Y_2O_3$ Phase Diagram", Lakiza et al., Powder Metallurgy and Metal Ceramics, vol. 34, No. 11-12, 1995, pp. 655-659.

"Metastable Phase Relationships in the System $Al_2O_3$-$ZrO_2$-$Y_2O_3$", Lakiz and Lopato, Powder Metallurgy and Metal Ceramics, vol. 35, Nos. 11-12, 1996, pp. 621-626.

"Solidus Surface and Phase Equilibria During the Solidification of Alloys in the $Al_2O_3$-$ZrO_2$-$Y_2O_3$ System", Lakiza et al., Powder Metallurgy and Metal Ceramics, vol. 34, Nos. 1-2, 1995, pp. 64-67.

"Methods of Investigation of Properties of Powder Materials, Interactions in the $Al_2O_3$-$ZrO_2$-$Y_2O_3$ System", Lakiza et al., Powder Metallurgy and Metal Ceramics, vol. 33, Nos. 9-10, 1994, pp. 486-490.

"Rapid Solidification of Ceramics a Technology Assessment", Brockway et al. Metals and Ceramics Information Center, MCIC Report, Jan. 1984 MCIC 84-49.

Figs. 311, 346, 350, 354-56, 373, and 716, Phase Diagrams for Ceramists, The American Ceramic Society, 1964, pp. 122, 136, 138, 140, 144, 248.

Figs. 2340-44, 2363, 2370, 2374-75, 2382-83, 2385, 2387, 2390, and 2392, Phase Diagrams for Ceramists, 1969 Supplement, The American Ceramic Society, 1969, pp. 95-96, 100, 102-103, 105-108.

Figs. 4366-71, 4377-78, 4404-05, 4417, 4426, 4430, 4433, 4437, 4440, 4444, 4457, 4572, and 4602, Phase Diagrams for Ceramists, 1975 Supplement, The American Ceramic Society, 1975, pp. 130-132, 135-136, 147, 152, 157, 159-160, 163-164, 166, 172-173, 238, 257.

Figs. 5042, 5211, 5217, 5224, 5228, 5232, 5237, 5239, 5241, 5245, 5251, 5257, 5418, and 5437, Phase Diagrams for Ceramists, vol. IV, The American Ceramic Society, 1981, pp. 29, 125, 127, 129-131, 133, 135-137, 139, 141, 143, 220, 228.

Fig. 6464, Phase Diagrams for Ceramists, vol. VI, The American Ceramic Society, 1981, p. 162.

Figs. 9262, and 9264, Phase Diagrams for Ceramists, vol. XI, Oxides, The American Ceramic Society, 1995, pp. 105-106.

"Phase Equilibria in the Yttrium Oxide-Alumina System", Toropov et al., Bulletin of the Academy of Sciences, USSR, Division of Chemical Science, No. 7, Jul. 1964, pp. 1076-1081, a translation of Seriya Khimicheskaya.

McKittrick, Joanna, et al., "Non-stoichiometry and defect structures in rapidly solidified $MgO$-$Al_2O_3$-$ZrO_2$ ternary eutectics," Materials Science and Engineering A231 (1997) 90-97.

Weber, J.K. Richard et al., "Glass fibres of pure and erbium- or neodymium-doped yttria-alumina compositions", Nature, Jun. 25, 1998, vol. 393, pp. 769-771.

Waku, Yoshiharu, et al., "A jelly-like ceramic fiber at 1193 K", Mat Res Innovat, 2000, vol. 3, pp. 185-189.

Weber, J.K. Richard et al., "Glass Formation and Polyamorphism in Rare-Earth Oxide-Aluminum Oxide Compositions", J. American Ceramic Society, 83 [8], 2000, 1868-1872.

Aguilar, E.A., "Processing and crystallization of rapidly solidified $Al_2O_3$-$Y_2O_3$ fibres", British Ceramic Transactions, 2000, vol. 99, No. 6, pp. 256-259.

U.S. Patent Application entitled "Fused $Al_2O_3$-$Y_2O_3$-$ZrO_2$ Eutectic Abrasive Particles, Abrasive Articles, and Methods of Making and Using the Same", filed Jul. 19, 2000, Rosenflanz having U.S. Appl. No. 09/618,876. WO2002/008143.

U.S. Appl. No. 10/358,910, filed Feb. 5, 2003, Ceramics and Methods of Making the Same now abandoned.

"$Gd_3Al_5O_{12}$ Phase Obtained by Crystallization of Amorphous $Gd_2O_3$·⅔ $Al_2O_3$," Shishido et al., Journal of the American Ceramic Society, vol. 61, No. 7-8, Jul.-Aug. 1978, pp. 373-374.

"Rapid Quenching on the Binary Systems of High Temperature Oxides, " Suzuki et al., Mat. Res. Bull., vol. 9, 1974, pp. 745-754.

"Unusual Glass Formation in the Al-Nd-O System," Yajima et al., Chemistry Letters (published by the Chemical Society of Japan), 1973, pp. 741-742.

Glass Formation in the Ln-Al-O System, (Ln: Lanthanoid and Yttrium Elements), Yajima et al., Chemistry Letters, 1973, pp. 1327-1330.

"Production and Studies of Alumina Based Refractory Glass," Coutures et al., Mat. Res. Bull., vol. 10, No. 6, 1975, pp. 539-546.

"Net Optical Gain At 1.53 μm in Er-Doped $Al_2O_3$ Waveguides on Silicon," van den Hoven et al., Appl. Phys. Lett. 68 (14), Apr. 1, 1966, pp. 1886-1888.

"Durable 3-5 μm Transmitting Infrared Window Materials," Harris et al., Infrared Physics & Technology 39, 1998, pp. 185-201.

"Erbium-Doped Phosphate Glass Waveguide on Silicon With 4.1 dB/cm Gain At 1.535 μm," Yan et al., Appl. Phys. Lett, 71 (20), Nov. 17, 1997.

Kondrashov V I et al., "Opacified Glass "Decorit" Synthesis Directions", Steklo I Keramika 2001, No. 1, pp. 8-11.

Imakoa, Minoru et al., "Refractive Index and Abbe's Number of Glass of Lanthanum Borate System", Journal Ceramic Assoc. Japan, vol. 70, No. 5, (1962), pp. 115.

Kingery, W.D., Introduction to Ceramics, Second Edition, Chpt. III subchapter 8.8, Glass-Ceramic Materials, pp. 368-374, (1976).

Kokubo, Tadashi et al., "Infrared Transmission of ($R_2O$ or R'O)-($TiO_2$, $Nb_2O_5$ or $Ta_2O_5$)-$Al_2O_3$ Glasses", Journal of Non-Crystalline Solids 22 (1970) 125-134.

McMillan, P.W., Glass-Ceramics, Academic Press, Inc., $2^{nd}$ Edition (1979).

Stookey. S. D., Ceramics Made by Nucleation of Glass-Comparison of Microstructure and Properties with Sintered Ceramics, The American Ceramic Society, (1992), pp. 1-4.
Varshneya, Arun K., "Fundamentsal of Inorganic Glasses", pp. 425-427 (1994).
"Rare Earth Oxide-Aluminum Oxide Glasses for Mid-Range IR Devices," Weber et al., reference obtained in 2003, and believed to be based on a talk presented Jan. 25, 2003 (See website http://www.spie.org/Conferences/Programs/03/pw/bios/index.cfm?fuseaction=4957, pp. 1 and 4 of 6).
Device Materials Based on Er-, Ho-, Tm-, and Yb-Doped Rare Earth Aluminum Oxide (REA1™) Glass, Weber et al., reference obtained in 2003, and believed to be based on a talk presented Jan. 28, 2003 (See website http://www.spie.org/Conferences/Programs/03/pw/opto/index.cfm?fuseaction=4999, pp. 1 and 2 of 5).
Aasland and McMillan, Nature 369, 633 (1994).
Aguilar et al, "Melt Extraction Processing of Structural $Y_2O_3$-$Al_2O_3$ Fibers", J. Eur. Ceram. Soc. 20 1091-1098 (2000).
Gandhi, A.S. and Jarayam, V., "Pressure Consolidation of Amorphous $ZrO_2$-$Al_2O_3$ by Plastic Deformation of Powder Particles", Acta Materiala, 50 (2002), 2137-2149.
Gonzalez, Eduardo J., et al., "High Pressure Compaction and Sintering of Nano-Size γ-$Al_2O_3$ Powder", *Materials and Manufacturing Processes* vol. 11, No. 6, 951-967, 1996.
Jantzen, C.M., Krepski, R.P., & Herman, H., "Ultra-Rapid Quenching of Laser-Method Binary and Unary Oxides", *Mat. Res. Bull.* 15, 1313-1326 (1980).
Khor K.A., "Novel ZrO2-Mullite Composites Produced by Plasma Spraying", Proceedings of the 15$^{th}$ International Thermal Pray Conference, May 25-29, 1998, Nice, France.
Ray, C.S. and Day, D.E., "Determining the Nucleation Rate Curve for Lithium Disilicate Glass by Differential Thermal Analysis", J. Am. Ceram. Soc. 73(2) 439-442 (1990).
Schmucker, M, et al., "Constitution of Mullite Glasses Produced by Ultra-Rapid Quenching of Plasma-Sprayed Melts", Journal of the European Ceramic Society 15 (1995) 1201-1205.
Sarjeant, P.T, & Roy, R., in *Reactivity of Solids* (ed. J. W. Mitchell, R.C., DeVries, R.W., Roberts and P. Cannon) 725-33 (John Wiley & Sons, Inc., New York 1969).
Takamori, T., & Roy, R., "Rapid Crystallization of SiO2-Al2O3 Glasses", Journal of American Society, vol. 56, No. 12, Dec. 1973.
Weber et al., "Synthesis and Optical Properties of Rare-Earth-Aluminum Oxide Glasses", J. Am. Ceram. Soc. 85(5) 1309-1311 (2002).
Wilding, M.C., McMillan, P.F., "Polyamorphic Transitions in Yttria-Alumina Liquids", *J. Non-Cryst. Solids.* 293-295, 357-365 (2001).
White et al. (1983). A Lanthanum Titanium Porous Glass Ceramic. *Journal of Materials Science*, 18, 3409-3414.
Shishido et al. (1978). Ln-M-O Glasses Obtained by Rapid Quenching Using a Laser Beam. *Journal of Materials Science*, 13, 1006-1014.
Topol, L. E., et al. (1973). Formation of New Oxide Glasses by Laser Spin Melting and Free Fall Cooling. *Journal of Non-Crystalline Solids*, 12, 377-390.
Adylov et al., "Research on Mullite Produced by Melting in Solar Furnaces," Federal Technical Institute—Research and Production Association "Physics—Sun"—FTI NPO "Fizika—Solntse".
Bataliants et al., "Application of low-temperature plasma in glass and glass ceramic industry," Tsniitei Publishers (1973) pp. 26-27.
Batygin et al., "Vacuum-dense ceramic and its alloys with metals," Chemical-Mineralogical Composition and Structure.
Choudhury et al., "Bulk, Dense, Nanocrystalline Yttrium Aluminum Garnet by Consolidation of Amorphous Powders at Low Temperatures and High Pressures," *J. Am. Ceram. Soc.*, vol. 86, No. 2 (2003) pp. 247-251.
Kingery et al., "Structure of Glasses," *Introduction to Ceramics*, 2$^{nd}$ Edition, John Wiley & Sons (1976), pp. 95-109.
Kriuchkov et al., "$Al_2O_3$-$ZrO_2$ Ceramics Made of Powders Obtained by Technique of High-Speed Hardening from Melt," *Refractory Materials*, No. 6 (1989) pp. 19-22.
Kryuchkov et al., "$Al_2O_3$-$ZrO_2$ Ceramics from Powders Produced by the Method of High-Speed Melt Solidification," *Institute of Organic and Inorganic Chemistry of USSR Academy of Sciences*, pp. 19-21.
MacChesney et al., "The System $La_2O_3$-$TiO_2$; Phase Equilibria and Electrical Properties," *Journal of the American Ceramic Society*, vol. 45, No. 9 (1962) pp. 416-422.
McMillan, "Glass Ceramic," (1967) pp. 26-27.
Pavlushkin, "Fundamentals of Glass Ceramics Technology," Moscow, Stroyizdat Publishers, (1979) pp. 71-72.
Polling, "Scandium, Yttrium, Lanthanum and Rare-earth metals," *General Biochemistry*, Moscow, Mir., (1964) pp. 426-427.
Shvedkov et al., "Dictionary-reference guide of the metal powder industry," Kiev, Naukova-Dumka, (1982) p. 17.
Strelov et al., "Technology of refractory materials," *Metallurgiya Publishers*, (1988) p. 137.
White et al., "A lanthanum titanium porous glass ceramic," *J. Mat. Sci.*, vol. 18 (1983) pp. 3409-3414.
Zhou et al., "Metastable Phase Formation in Plasma-Sprayed $ZrO_2$ ($Y_2O_3$)—$Al_2O_3$," *J. Am. Ceram. Soc.*, vol. 86, No. 8 (2003) pp. 1415-1420.
Gutzow et al., *The Vitreous State—Thermodynamics, Structure, Rheology, and Crystallization*, Springer-Verlag Berlin Heidelberg (1995) pp. 26-27.
Lakiza et al., "Triangulation and Liquidus Surface in the $Al_2O_3$—$ZrO_2$—$La_2O_3$ Phase Diagram," Powder Metallurgy and Metal Ceramics, vol. 41, Nos. 11-12 (2002) pp. 627-636.
Shelby, "Introduction to Glass Science and Technology," The Royal Society of Chemistry, Chpt. 6, pp. 108-109 (1997).
Li et al., 2007, *Journal of Macromolecular Science, Part B*, 46(4):761-764; entitled "The Nucleation Effect of Grafted Carbon Black on Crystallization of Poly(Ethylene Terephthalate)/Grafted Carbon Black Composite".
Yan et al., *Trans. Nonferrous Met. Soc. China*, 18(2008) 138-144; entitled "Applicability of Johnson-Mehl-Avrami model to crystallization kinetics of $Zr_{60}Al_{15}Ni_{25}$ bulk amorphous alloy".

* cited by examiner

METAL OXIDE CERAMIC AND METHOD OF MAKING ARTICLES THEREWITH

CROSS-REFERENCE TO RELATED APPLICATIONS

This application is a continuation of U.S. Ser. No. 10/211,491, filed Aug. 2, 2002, which is a continuation-in-part of U.S. Ser. No. 09/922,526, filed Aug. 2, 2001, now abandoned, the disclosures of which are incorporated herein by reference.

FIELD OF THE INVENTION

The present invention relates to a metal oxide ceramic and a method of making articles therewith. Examples of articles include kitchenware (e.g., plates), dental brackets, and reinforcing fibers, cutting tool inserts, abrasives, and structural components of gas engines, (e.g., valves and bearings).

DESCRIPTION OF RELATED ART

A large number of glass and glass-ceramic compositions are known. The majority of oxide glass systems utilize well-known glass-formers such as $SiO_2$, $B_2O_3$, $P_2O_5$, $GeO_2$, $TeO_2$, $As_2O_3$, and $V_2O_5$ to aid in the formation of the glass. Some of the glass compositions formed with these glass-formers can be heat-treated to form glass-ceramics. The upper use temperature of glasses and glass-ceramics formed from such glass formers is generally less than 1200° C., typically about 700-800° C. The glass-ceramics tend to be more temperature resistant than the glass from which they are formed.

Although a large number of metal oxides can be obtained in an amorphous state by melting and rapidly quenching, most, because of the need for very high quench rates to provide amorphous rather than crystalline material, cannot be formed into bulk or complex shapes. Generally, such systems are very unstable against crystallization during subsequent reheating and therefore do not exhibit typical properties of glass such as viscous flow. On the other hand, glasses based on the known network forming oxides (e.g., $SiO_2$ and $B_2O_3$) are generally relatively stable against crystallization during reheating and, correspondingly, the "working" range where viscous flow occurs can be readily accessed. Formation of large articles from powders of known glass (e.g., $SiO_2$ and $B_2O_3$) via viscous sintering at temperatures above glass transition temperature is well known. For example, in the abrasive industry, grinding wheels are made using vitrified bond to secure the abrasive particles together.

It is desirable to provide large articles and/or complex shapes comprising non-traditional glass and glass-ceramic compositions.

SUMMARY OF THE INVENTION

Disclosed herein is a ceramic comprising: at least two different metal oxides, the at least two different metal oxides comprising $TiO_2$ and $La_2O_3$ or $TiO_2$ and BaO; less than 20% by weight $SiO_2$; less than 20% by weight $B_2O_3$; and less than 40% by weight $P_2O_5$; the ceramic having a glass transition temperature, $T_g$, and a crystallization onset temperature, $T_x$, and the difference between $T_g$ and $T_x$ is at least 5K. The ceramic may also comprise an additional metal oxide selected from the group consisting of $Al_2O_3$, CaO, $Cr_2O_3$, CoO, $Fe_2O_3$, $GeO_2$, $HfO_2$, $Li_2O$, MgO, MnO, NiO, $Na_2O$, $P_2O_5$, $CeO_2$, $Dy_2O_3$, $Er_2O_3$, $Eu_2O_3$, $Gd_2O_3$, $Ho_2O_3$, $Lu_2O_3$, $Nd_2O_3$, $Pr_6O_{11}$, $Sm_2O_3$, $Th_4O_7$, $Tm_2O_3$, $Yb_2O_3$, $Sc_2O_3$, $SiO_2$, SrO, $TeO_2$, $TiO_2$, $V_2O_3$, $Y_2O_3$, ZnO, $ZrO_2$, and combinations thereof.

Also disclosed herein is a method of making an article, comprising: providing a glass in a form comprising particles, beads, microspheres, or fibers; the glass comprising: at least two different metal oxides, the at least two different metal oxides comprising $TiO_2$ and $La_2O_3$ or $TiO_2$ and BaO; less than 20% by weight $SiO_2$; less than 20% by weight $B_2O_3$; and less than 40% by weight $P_2O_5$; the glass having a glass transition temperature, $T_g$, and a crystallization onset temperature, $T_x$, and the difference between $T_g$ and $T_x$ is at least 5K; and heating the glass above the $T_g$ to coalesce to form a coalesced shape; and cooling the coalesced shape.

The method may further comprise providing a substrate including an outer surface; wherein heating the glass above the $T_g$ comprises heating the glass such that at least a portion of the glass wets at least a portion of the outer surface; and wherein after cooling, the coalesced shape is attached to the outer surface.

The glass used in the disclosed method may further comprise a second glass having a second glass transition temperature, $T_{g2}$, and a second crystallization onset temperature, $T_{x2}$, and the difference between $T_{g2}$ and $T_{x2}$ is at least 5K.

DETAILED DESCRIPTION

Figure 1:
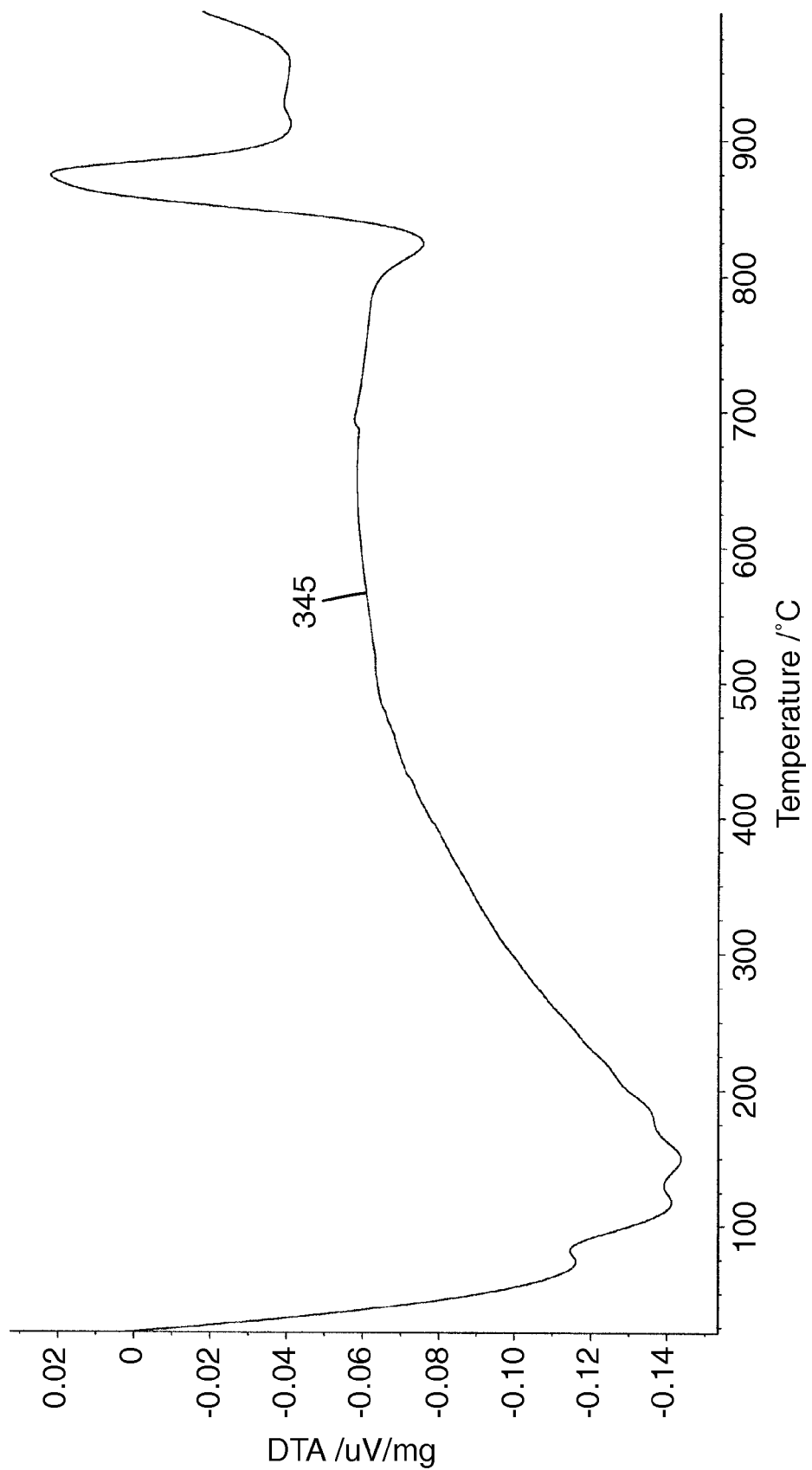
FIG. 1 is a DTA curve of Example 1 material.
Figure 2:
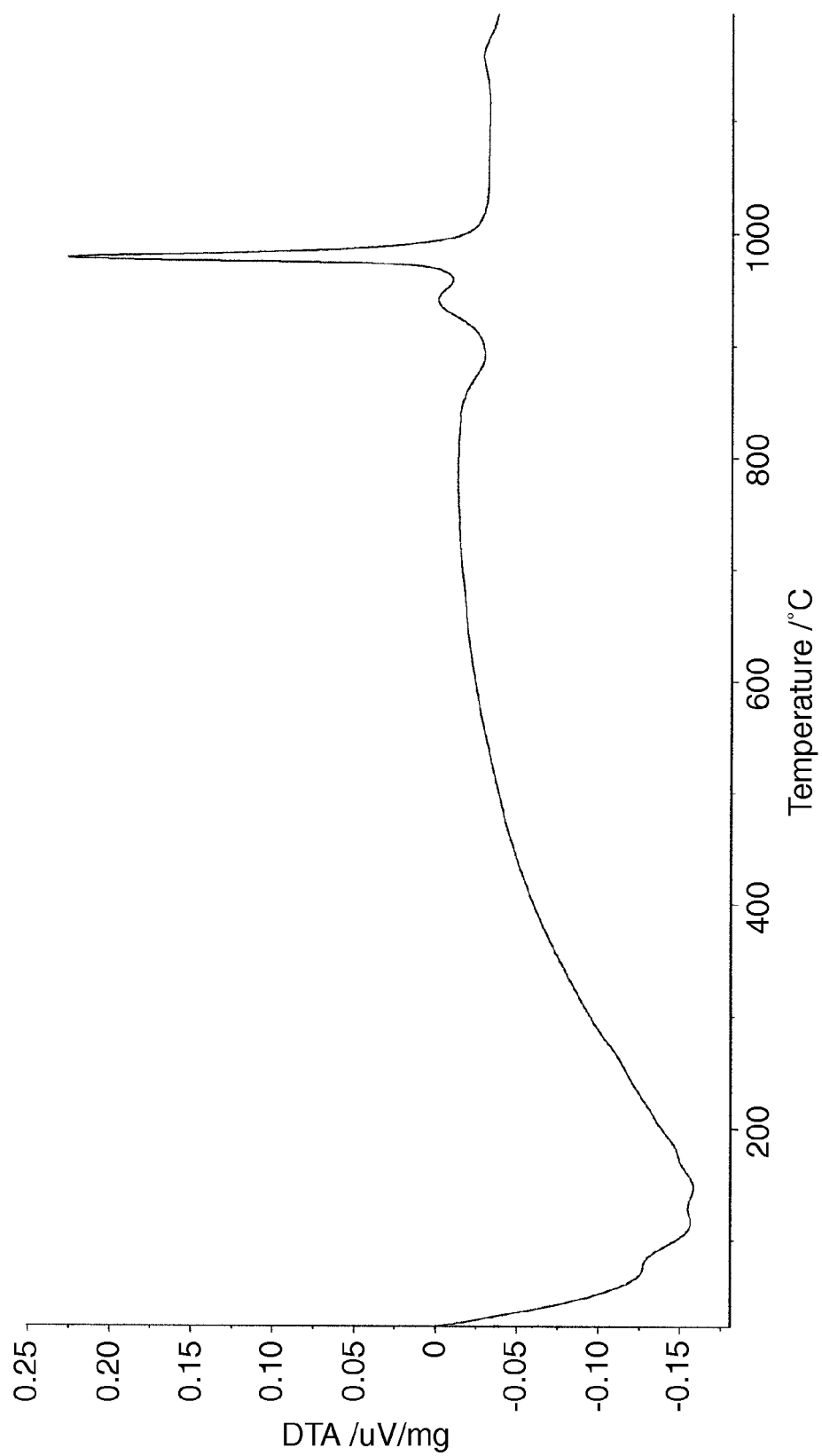
FIGS. 2-6 are DTA curves of Examples 2, 5, 6, 7, and 9 materials, respectively.
Figure 3:
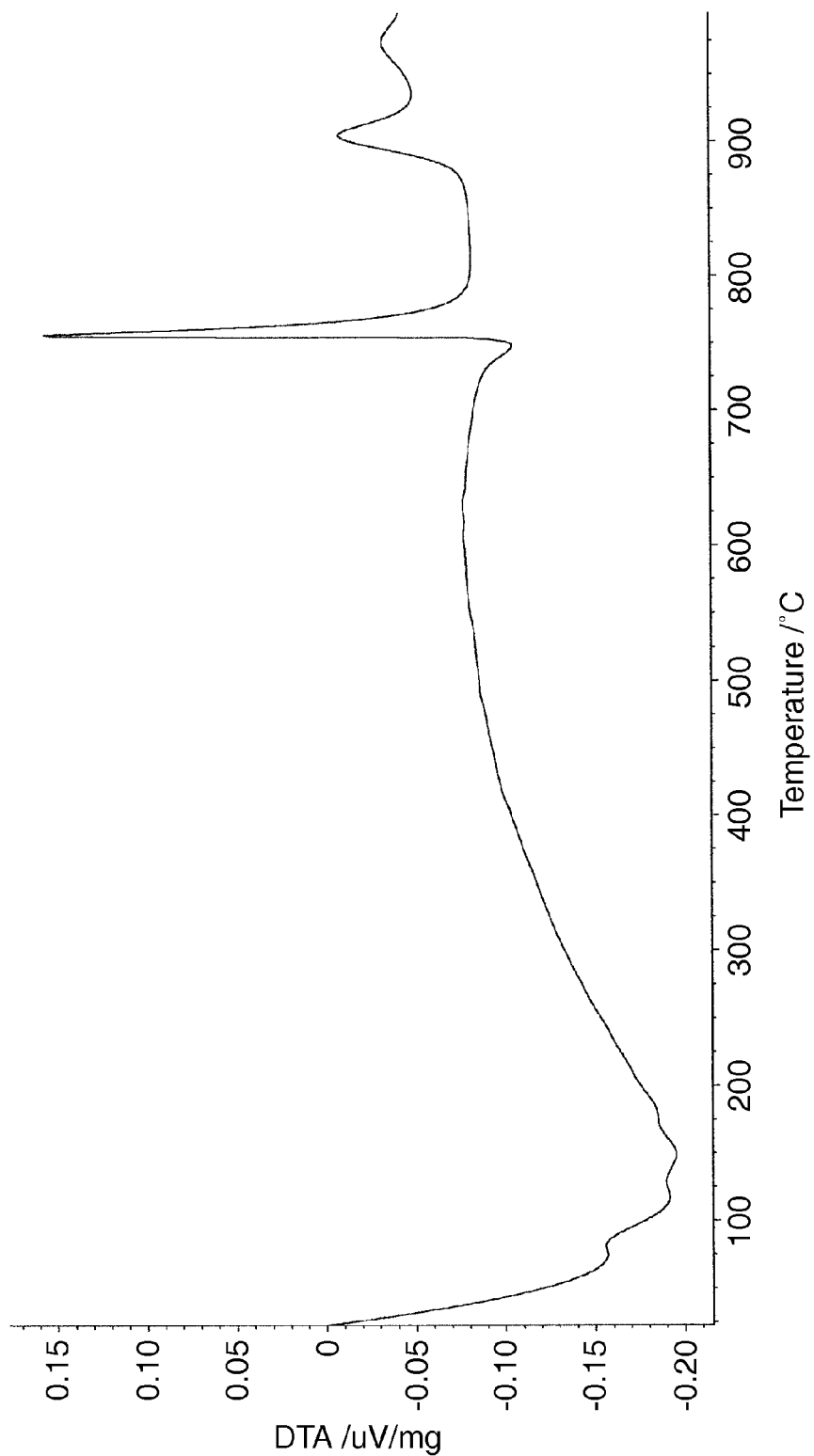
Figure 4:
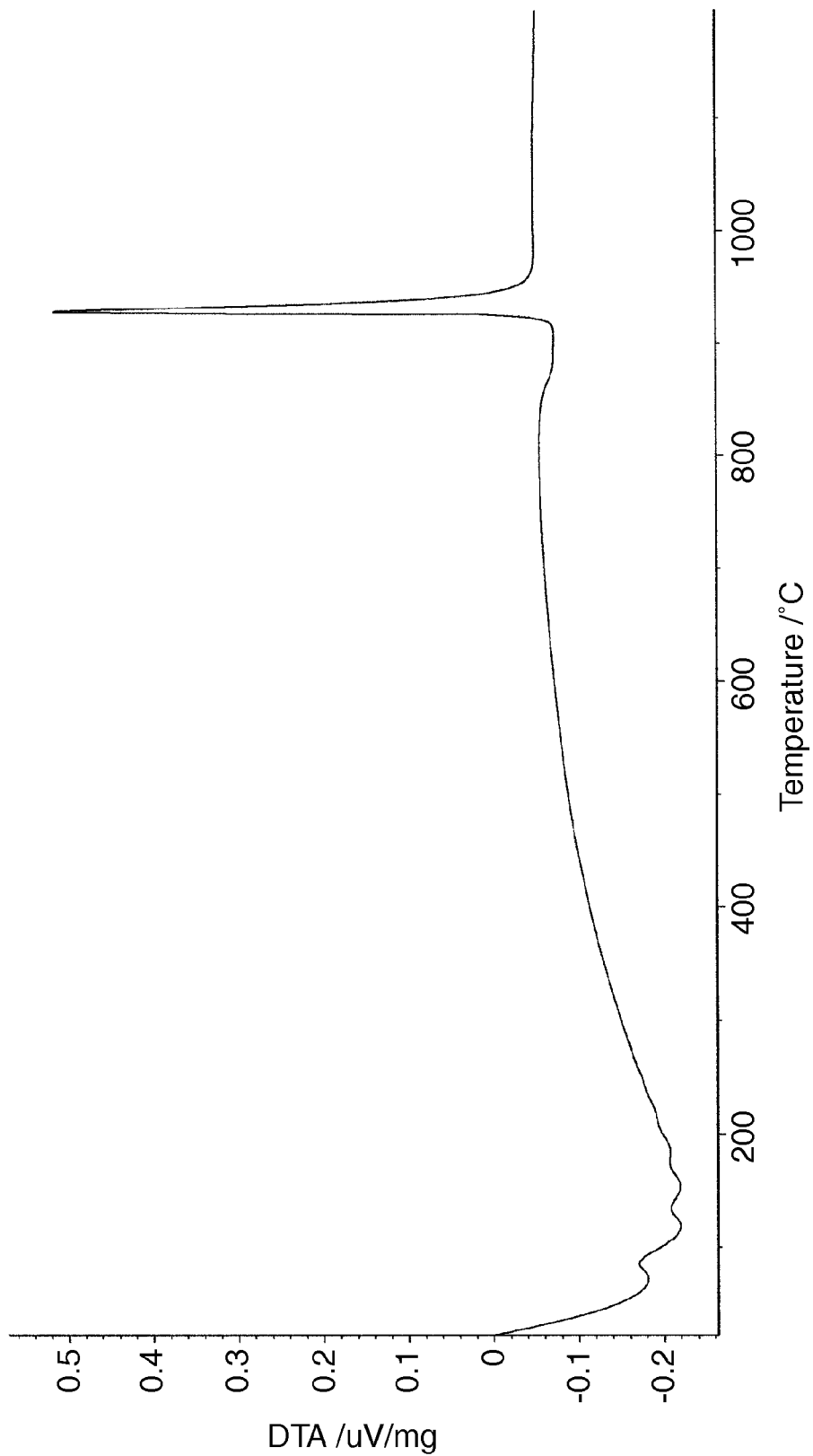
Figure 5:
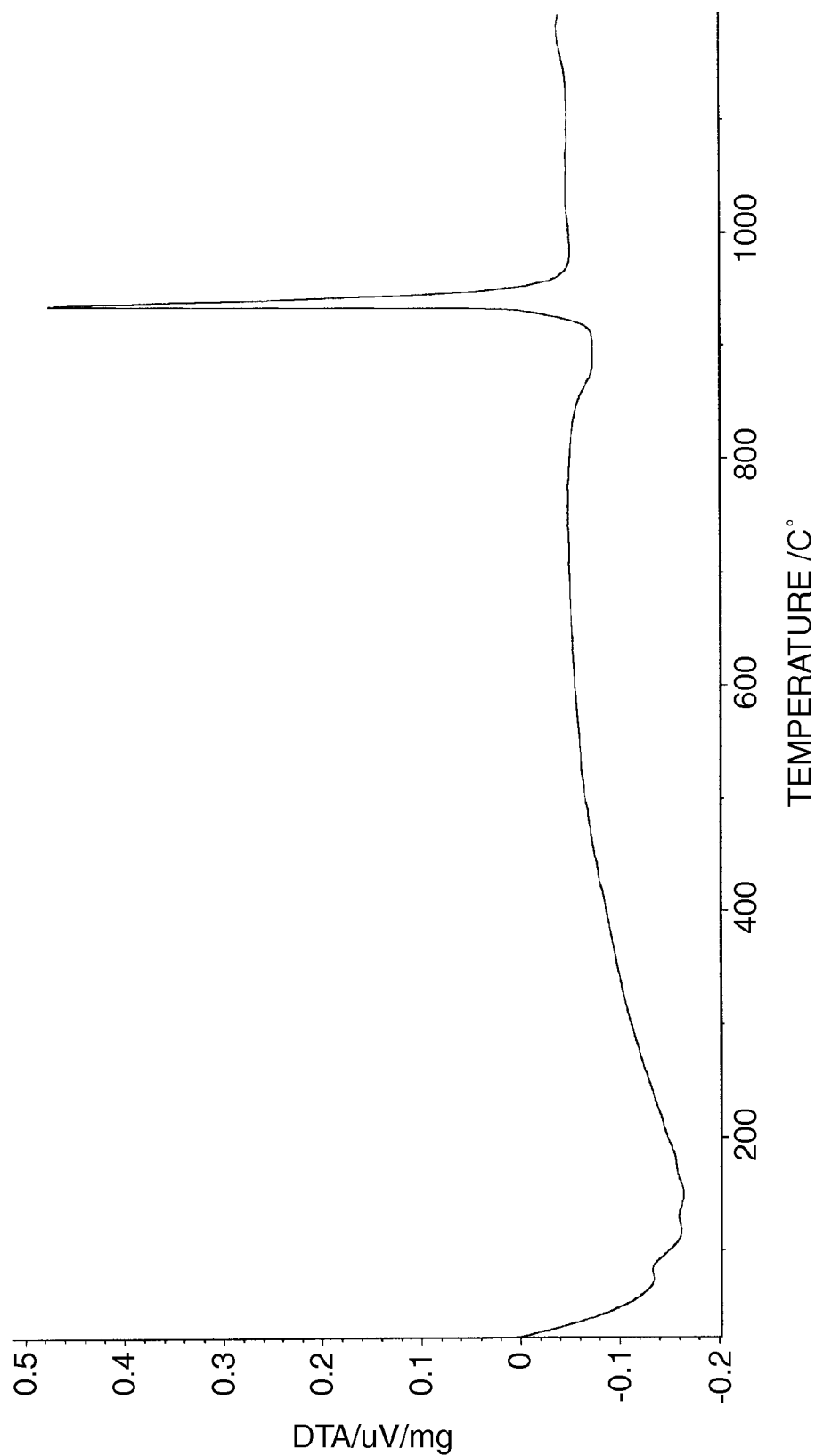
Figure 6:
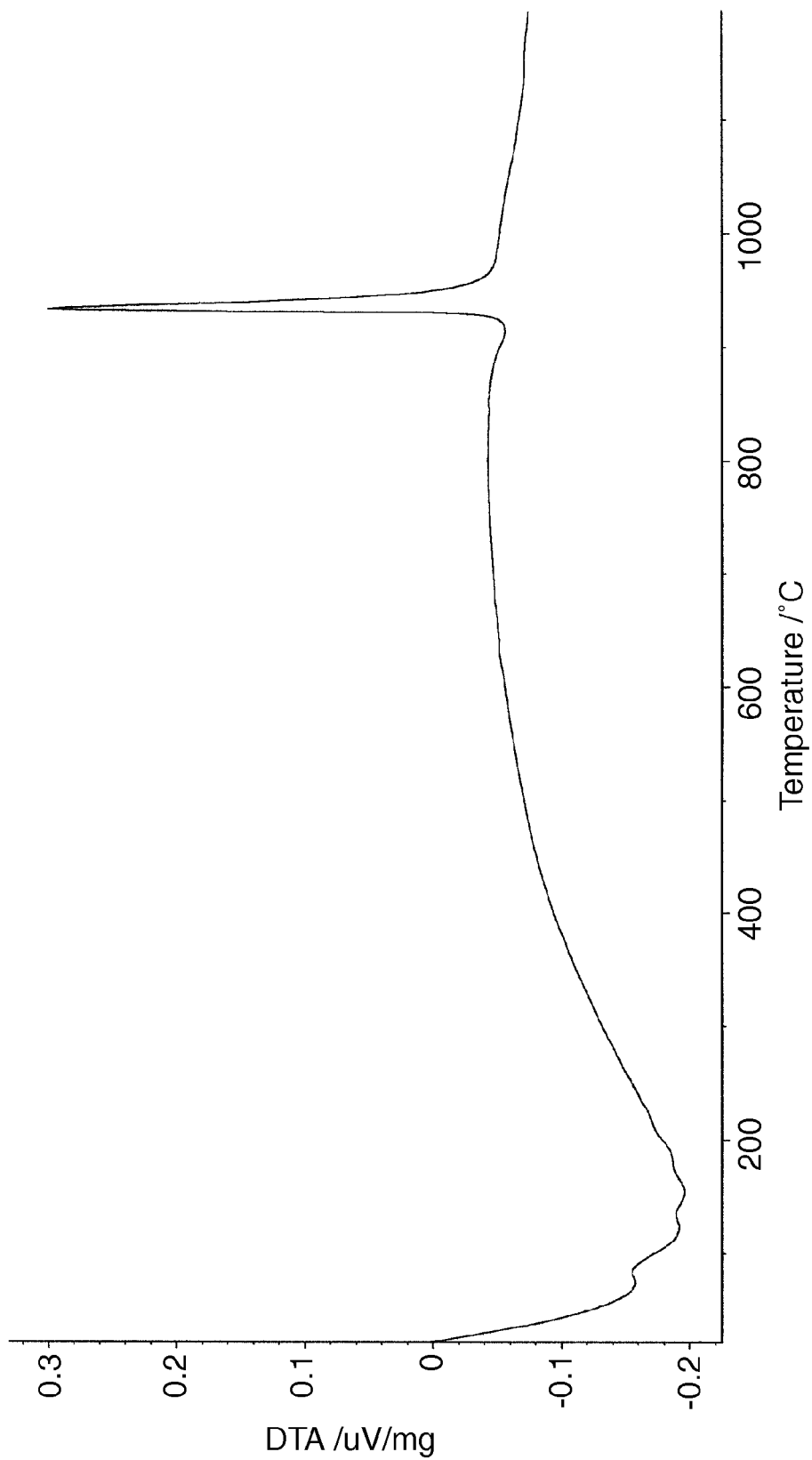

The present invention provides a method of making articles from glass. Optionally, the articles may be a composite of two or more different glass compositions or formulations. In some embodiments the glass is optionally heat-treated to at least partially crystallize the glass.

One embodiment of the present invention provides a method of making an article from glass comprising:

providing a substrate (e.g., ceramics, metals, intermetallics, and composites thereof) including an outer surface;

providing at least a first glass (e.g., sheets, particles (including microspheres), and fibers), wherein the first glass comprises at least two different metal oxides (i.e., the metal oxides do not have the same cation(s)), wherein the first glass has a $T_g$ and $T_x$, and wherein the difference between the $T_g$ and the $T_x$ of the first glass is at least 5K (or even, at least 10K, at least 15K, at least 20K, at least 25K, at least 30K, or at least 35K), the first glass containing less than 20% by weight $SiO_2$ (or even less than 15%, less than 10%, less than 5% by weight, or even zero percent, by weight, $SiO_2$), less than 20% by weight $B_2O_3$ (or even less than 15%, less than 10%, less than 5% by weight, or even zero percent, by weight, $B_2O_3$), and less than 40% by weight $P_2O_5$ (or even less than 35%, less than 30%, less than 25%, less than 20%, less than 15%, less than 10%, less than 5% by weight, or even zero percent, by weight, $P_2O_5$);

heating the first glass above the $T_g$ such that at least a portion of the glass wets at least a portion of the outer surface of the substrate; and cooling the glass to provide an article comprising ceramic comprising the glass attached to the at least a portion of the outer surface of the substrate. In some embodiments, the ceramic is glass. Optionally, the method can be practiced with a second, a third, or more, different glass, including glasses having, respectively, a $T_g$ and $T_x$, and wherein the difference between each $T_g$ and the $T_x$ of a glass is at least 5K (or even, at least 10K, at least 15K, at least 20K, at least 25K, at least 30K, or at least 35K), one or more of the additional glasses optionally contain less than 20% by weight $SiO_2$ (or even less than 15%, less than 10%, less than 5% by weight, or even zero percent, by weight, $SiO_2$), less than 20% by weight $B_2O_3$ (or even less than 15%, less than 10%, less than 5% by weight, or even zero percent, by weight, $B_2O_3$), and less than 40% by weight $P_2O_5$ (or even less than 35%, less than 30%, less than 25%, less than 20%, less than 15%, less than 10%, less than 5% by weight, or even zero percent, by weight, $P_2O_5$). Preferably the glass, or if more than one glass is used, at least one of the glasses, comprises less than 40 percent (preferably, less than 35, 30, 25, 20, 15, 10, 5, or even 0) by weight glass collectively $SiO_2$, $B_2O_3$, and $P_2O_5$, based on the total weight of the glass.

Another embodiment of the present invention provides a method of making an article from glass comprising:

providing a substrate including an outer surface;

providing at least a first plurality of particles comprising glass (including glass particles), wherein the glass comprises at least two different metal oxides, wherein the glass has a $T_g$ and $T_x$, and wherein the difference between the $T_g$ and the $T_x$ of the glass is at least 5K (or even, at least 10K, at least 15K, at least 20K, at least 25K, at least 30K, or at least 35K), the glass containing less than 20% by weight $SiO_2$ (or even less than 15%, less than 10%, less than 5% by weight, or even zero percent, by weight, $SiO_2$), less than 20% by weight $B_2O_3$ (or even less than 15%, less than 10%, less than 5% by weight, or even zero percent, by weight, $B_2O_3$), and less than 40% by weight $P_2O_5$ (or even less than 35%, less than 30%, less than 25%, less than 20%, less than 15%, less than 10%, less than 5% by weight, or even zero percent, by weight, $P_2O_5$);

heating the glass above the $T_g$ such that at least a portion of the glass of the first plurality of particles wets at least a portion of the outer surface of the substrate; and cooling the glass to provide an article comprising ceramic comprising the glass attached to the at least a portion of the outer surface of the substrate. In some embodiments, the ceramic is glass. Optionally, the method can be practiced with a second, a third, or more, different pluralities of particles comprising (different) glasses, including glasses having, respectively, a $T_g$ and $T_x$, and wherein the difference between each $T_g$ and the $T_x$ of a glass is at least 5K (or even, at least 10K, at least 15K, at least 20K, at least 25K, at least 30K, or at least 35K), one or more of the additional glasses optionally contain less than 20% by weight $SiO_2$ (or even less than 15%, less than 10%, less than 5% by weight, or even zero percent, by weight, $SiO_2$), less than 20% by weight $B_2O_3$ (or even less than 15%, less than 10%, less than 5% by weight, or even zero percent, by weight, $B_2O_3$), and less than 40% by weight $P_2O_5$ (or even less than 35%, less than 30%, less than 25%, less than 20%, less than 15%, less than 10%, less than 5% by weight, or even zero percent, by weight, $P_2O_5$). Preferably the glass, or if more than one glass is used, at least one of the glasses, comprises less than 40 (preferably, less than 35, 30, 25, 20, 15, 10, 5, or even 0) percent by weight glass collectively $SiO_2$, $B_2O_3$, and $P_2O_5$, based on the total weight of the glass.

Another embodiment of the present invention provides a method of making an article comprising:

providing at least a first glass and second glass (e.g., sheets, particles (including microspheres), and fibers), wherein the first glass comprises at least two different metal oxides, wherein the first glass has a $T_{g1}$ and $T_{x1}$, and wherein the difference between the $T_{g1}$ and the $T_{x1}$ is at least 5K (or even, at least 10K, at least 15K, at least 20K, at least 25K, at least 30K, or at least 35K), the first glass containing less than 20% by weight $SiO_2$ (or even less than 15%, less than 10%, less than 5% by weight, or even zero percent, by weight, $SiO_2$), less than 20% by weight $B_2O_3$ (or even less than 15%, less than 10%, less than 5% by weight, or even zero percent, by weight, $B_2O_3$), and less than 40% by weight $P_2O_5$ (or even less than 35%, less than 30%, less than 25%, less than 20%, less than 15%, less than 10%, less than 5% by weight, or even zero percent, by weight, $P_2O_5$);

heating the first and second glasses above at least $T_{g1}$ and at least the first glass coalescing with the second glass to provide the article. Optionally, the second glass has a $T_{g2}$ and $T_{x2}$, wherein the difference between $T_{g2}$ and $T_{x2}$ is at least 5K (or even, at least 10K, at least 15K, at least 20K, at least 25K, at least 30K, or at least 35K). Optionally, the second glass contains less than 20% by weight $SiO_2$ (or even less than 15%, less than 10%, less than 5% by weight, or even zero percent, by weight, $SiO_2$), less than 20% by weight $B_2O_3$ (or even less than 15%, less than 10%, less than 5% by weight, or even zero percent, by weight, $B_2O_3$), and less than 40% by weight $P_2O_5$ (or even less than 35%, less than 30%, less than 25%, less than 20%, less than 15%, less than 10%, less than 5% by weight, or even zero percent, by weight, $P_2O_5$). Optionally, the method can be practiced with a third, a fourth, glass, etc. including glasses having, respectively, a $T_g$ and $T_x$, and wherein the difference between each $T_g$ and the $T_x$ of a glass is at least 5K (or even, at least 10K, at least 15K, at least 20K, at least 25K, at least 30K, or at least 35K), one or more of the additional glasses optionally contain less than 20% by weight $SiO_2$ (or even less than 15%, less than 10%, less than 5% by weight, or even zero percent, by weight, $SiO_2$), less than 20% by weight $B_2O_3$ (or even less than 15%, less than 10%, less than 5% by weight, or even zero percent, by weight, $B_2O_3$), and less than 40% by weight $P_2O_5$ (or even less than 35%, less than 30%, less than 25%, less than 20%, less than 15%, less than 10%, less than 5% by weight, or even zero percent, by weight, $P_2O_5$). The glasses may have the same composition, different composition, or combinations thereof. Preferably at least one of the glasses comprise less than 40 (preferably, less than 35, 30, 25, 20, 15, 10, 5, or even 0) percent by weight glass collectively $SiO_2$, $B_2O_3$, and $P_2O_5$, based on the total weight of the glass.

Another embodiment of the present invention provides a method of making an article comprising:

providing at least a first glass and second glass (e.g., sheets, particles (including microspheres), and fibers), wherein the first glass comprises at least two different metal oxides, wherein the first glass has a $T_{g1}$ and $T_{x1}$, and wherein the difference between the $T_{g1}$ and the $T_{x1}$ is at least 5K (or even, at least 10K, at least 15K, at least 20K, at least 25K, at least 30K, or at least 35K), the first glass containing less than 20% by weight $SiO_2$ (or even less than 15%, less than 10%, less than 5% by weight, or even zero percent, by weight, $SiO_2$), less than 20% by weight $B_2O_3$ (or even less than 15%, less than 10%, less than 5% by weight, or even zero percent, by weight, $B_2O_3$), and less than 40% by weight $P_2O_5$ (or even less than 35%, less than 30%, less than 25%, less than 20%, less than 15%, less than 10%, less than 5% by weight, or even zero percent, by weight, $P_2O_5$), and wherein the second glass comprises at least two different metal oxides, wherein the second glass has a $T_{g2}$ and $T_{x2}$, and wherein the difference between the $T_{g2}$ and the $T_{x2}$ is at least 5K (or even, at least 10K, at least 15K, at least 20K, at least 25K, at least 30K, or at least 35K), the second glass containing less than 20% by weight $SiO_2$ (or even less than 15%, less than 10%, less than 5% by weight, or even zero percent, by weight, $SiO_2$), less than 20% by weight $B_2O_3$ (or even less than 15%, less than 10%, less than 5% by weight, or even zero percent, by weight, $B_2O_3$), and less than 40% by weight $P_2O_5$ (or even less than 35%, less than 30%, less than 25%, less than 20%, less than 15%, less than 10%, less than 5% by weight, or even zero percent, by weight, $P_2O_5$);

heating the glasses above the higher of $T_{g1}$ or $T_{g2}$ and coalescing the first and second glasses to provide the article. Optionally, the method can be practices with a third, a fourth, glass, etc. including glasses having, respectively, a $T_g$ and $T_x$, and wherein the difference between each $T_g$ and the $T_x$ of a glass is at least 5K (or even, at least 10K, at least 15K, at least 20K, at least 25K, at least 30K, or at least 35K), one or more of the additional glasses optionally contain less than 20% by weight $SiO_2$ (or even less than 15%, less than 10%, less than 5% by weight, or even zero percent, by weight, $SiO_2$), less than 20% by weight $B_2O_3$ (or even less than 15%, less than 10%, less than 5% by weight, or even zero percent, by weight, $B_2O_3$), and less than 40% by weight $P_2O_5$ (or even less than 35%, less than 30%, less than 25%, less than 20%, less than 15%, less than 10%, less than 5% by weight, or even zero percent, by weight, $P_2O_5$). The glasses may have the same composition, different composition, or combinations thereof Preferably at least one of the glasses comprise less than 40 (preferably, less than 35, 30, 25, 20, 15, 10, 5, or even 0) percent by weight glass collectively $SiO_2$, $B_2O_3$, and $P_2O_5$, based on the total weight of the glass.

Another embodiment of the present invention provides a method of making an article comprising:

providing at least a first plurality of particles comprising glass (including glass particles), wherein the glass comprises at least two different metal oxides, wherein the glass has a $T_g$ and $T_x$, and wherein the difference between the $T_g$ and the $T_x$ of the glass is at least 5K (or even, at least 10K, at least 15K, at least 20K, at least 25K, at least 30K, or at least 35K), the glass containing less than 20% by weight $SiO_2$ (or even less than 15%, less than 10%, less than 5% by weight, or even zero percent, by weight, $SiO_2$), less than 20% by weight $B_2O_3$ (or even less than 15%, less than 10%, less than 5% by weight, or even zero percent, by weight, $B_2O_3$), and less than 40% by weight $P_2O_5$ (or even less than 35%, less than 30%, less than 25%, less than 20%, less than 15%, less than 10%, less than 5% by weight, or even zero percent, by weight, $P_2O_5$);

heating the glass above the $T_g$ and coalescing at least a portion of the first plurality of particles to provide the article. In some embodiments, the ceramic is glass. Optionally, the method can be practiced with a second, a third, or more, different pluralities of particles comprising (different) glasses, including glasses having, respectively, a $T_g$ and $T_x$, and wherein the difference between each $T_g$ and the $T_x$ of a glass is at least 5K (or even, at least 10K, at least 15K, at least 20K, at least 25K, at least 30K, or at least 35K), one or more of the additional glasses optionally contain less than 20% by weight $SiO_2$ (or even less than 15%, less than 10%, less than 5% by weight, or even zero percent, by weight, $SiO_2$), less than 20% by weight $B_2O_3$ (or even less than 15%, less than 10%, less than 5% by weight, or even zero percent, by weight, $B_2O_3$), and less than 40% by weight $P_2O_5$ (or even less than 35%, less than 30%, less than 25%, less than 20%, less than 15%, less than 10%, less than 5% by weight, or even zero percent, by weight, $P_2O_5$). Preferably the glass, or if more than one glass is used, at least one of the glasses, comprises less than 40 (preferably, less than 35, 30, 25, 20, 15, 10, 5, or even 0) percent by weight glass collectively $SiO_2$, $B_2O_3$, and $P_2O_5$, based on the total weight of the glass.

Desirably, the ratio of a $T_g$ to $T_1$ is at least 0.5. Examples of useful glass particles include those comprising REO-$Al_2O_3$—$ZrO_2$ and REO-$Al_2O_3$—$ZrO_2$—$SiO_2$ glasses. Other useful glasses may also include CaO—$Al_2O_3$, CaO—$Al_2O_3$—$ZrO_2$, BaO—$TiO_2$, $La_2O_3$—$TiO_2$, REO (i.e., rare earth oxide(s))-$Al_2O_3$ glasses.

Embodiments of the method according to the present invention, including for certain ceramic compositions, allow for the formation of article shapes and sizes that were obtainable from conventional methods. Coalescence of the glass is typically enhanced if the glass is under pressure during heating. In one embodiment, a charge of glass (e.g., particles (including beads), fibers, etc. is placed into a die and hot-pressing is performed at temperatures above glass transition where viscous flow of glass leads to coalescence into an article.

In this application:

"amorphous material" refers to material derived from a melt and/or a vapor phase that lacks any long range crystal structure as determined by X-ray diffraction and/or has an exothermic peak corresponding to the crystallization of the amorphous material as determined by a DTA (differential thermal analysis) as determined by the test described herein entitled "Differential Thermal Analysis";

"ceramic" includes amorphous material, glass, crystalline ceramic, glass-ceramic, and combinations thereof, "glass" refers to amorphous material exhibiting a glass transition temperature;

"glass-ceramic" refers to ceramic comprising crystals formed by heat-treating amorphous material;

"rare earth oxides" refers to cerium oxide (e.g., $CeO_2$), dysprosium oxide (e.g., $Dy_2O_3$), erbium oxide (e.g., $Er_2O_3$), europium oxide (e.g., $Eu_2O_3$), gadolinium (e.g., $Gd_2O_3$), holmium oxide (e.g., $Ho_2O_3$), lanthanum oxide (e.g., $La_2O_3$), lutetium oxide (e.g., $Lu_2O_3$), neodymium oxide (e.g., $Nd_2O_3$), praseodymium oxide (e.g., $Pr_6O_{11}$), samarium oxide (e.g., $Sm_2O_3$), terbium (e.g., $Tb_2O_3$), thorium oxide (e.g., $Th_4O_7$), thulium (e.g., $Tm_2O_3$), and ytterbium oxide (e.g., $Yb_2O_3$), and combinations thereof, "REO" refers to rare earth oxide(s);

"$T_g$" refers to the glass transition temperature as determined in Example 1;

"$T_1$" refers to the glass melting point; and

"$T_x$" refers to crystallization onset temperature as determined in Example 1.

Further, it is understood herein that unless it is stated that a metal oxide (e.g., $Al_2O_3$, complex $Al_2O_3$ metal oxide, etc.) is crystalline, for example, in a glass-ceramic, it may be amorphous, crystalline, or portions amorphous and portions crystalline. For example if a glass-ceramic comprises $Al_2O_3$ and $ZrO_2$, the $Al_2O_3$ and $ZrO_2$ may each be in an amorphous state, crystalline state, or portions in an amorphous state and portions in a crystalline state, or even as a reaction product with another metal oxide(s) (e.g., unless it is stated that, for example, $Al_2O_3$ is present as crystalline $Al_2O_3$ or a specific crystalline phase of $Al_2O_3$ (e.g. alpha $Al_2O_3$), it may be present as crystalline $Al_2O_3$ and/or as part of one or more crystalline complex $Al_2O_3$.metal oxides. Further, it is understood that glass-ceramics formed by heating amorphous material not exhibiting a $T_g$ may not actually comprise glass, but rather may comprise the crystals and amorphous material that does not exhibiting a $T_g$.

Optionally certain glass articles made according to the present invention can be heat-treated at least partially crystallize the glass to provide glass-ceramic.

In general, ceramics according to the present invention can be made by heating (including in a flame) the appropriate metal oxide sources to form a melt, desirably a homogenous melt, and then rapidly cooling the melt to provide amorphous materials or ceramic comprising amorphous materials. Amorphous materials and ceramics comprising amorphous materials according to the present invention can be made, for example, by heating (including in a flame) the appropriate metal oxide sources to form a melt, desirably a homogenous melt, and then rapidly cooling the melt to provide amorphous material. Embodiments of amorphous materials can be made, for example, by melting the metal oxide sources in any suitable furnace (e.g., an inductive heated furnace, a gas-fired furnace, or an electrical furnace), or, for example, in a plasma. The resulting melt is cooled (e.g., discharging the melt into a cooling media (e.g., high velocity air jets, liquids, metal plates (including chilled metal plates), metal rolls (including chilled metal rolls), metal balls (including chilled metal balls), and the like)).

Embodiments of amorphous materials can also be obtained by other techniques, such as: laser spin melt with free fall cooling, Taylor wire technique, plasmatron technique, hammer and anvil technique, centrifugal quenching, air gun splat cooling, single roller and twin roller quenching, roller-plate quenching and pendant drop melt extraction (see, e.g., *Rapid Solidification of Ceramics*, Brockway et. al, Metals And Ceramics Information Center, A Department of Defense Information Analysis Center, Columbus, Ohio, January, 1984, the disclosure of which is incorporated here as a reference). Embodiments of amorphous materials may also be obtained by other techniques, such as: thermal (including flame or laser or plasma-assisted) pyrolysis of suitable precursors, physical vapor synthesis (PVS) of metal precursors and mechanochemical processing.

In one method, glass useful for the present invention can be made utilizing flame fusion as disclosed, for example, in U.S. Pat. No. 6,254,981 (Castle), the disclosure of which is incorporated herein by reference. In this method, the metal oxide sources materials are fed (e.g., in the form of particles, sometimes referred to as "feed particles") directly into a burner (e.g., a methane-air burner, an acetylene-oxygen burner, a hydrogen-oxygen burner, and like), and then quenched, for example, in water, cooling oil, air, or the like. Feed particles can be formed, for example, by grinding, agglomerating (e.g., spray-drying), melting, or sintering the metal oxide sources. The size of feed particles fed into the flame generally determines the size of the resulting glass particles/beads.

Examples of useful glass for carrying out the present invention include those comprising $CaO$—$Al_2O_3$, $CaO$—$Al_2O_3$—$ZrO_2$, $BaO$—$TiO_2$, $La_2O_3$—$TiO_2$, $REO$-$Al_2O_3$, $REO$-$Al_2O_3$—$ZrO_2$, $REO$-$Al_2O_3$—$ZrO_2$—$SiO_2$, and $SrO$—$Al_2O_3$—$ZrO_2$ glasses. Useful glass formulations include those at or near a eutectic composition. In addition to the $CaO$—$Al_2O_3$, $CaO$—$Al_2O_3$—$ZrO_2$, $BaO$—$TiO_2$, $La_2O_3$—$TiO_2$, $REO$-$Al_2O_3$, $REO$-$Al_2O_3$—$ZrO_2$, $REO$-$Al_2O_3$—$ZrO_2$—$SiO_2$, and $SrO$—$Al_2O_3$—$ZrO_2$ compositions disclosed herein, other compositions, including eutectic compositions, will be apparent to those skilled in the art after reviewing the present disclosure. For example, phase diagrams depicting various compositions, including eutectic compositions, are known in the art.

Surprisingly, it was found that ceramics of present invention could be obtained without limitations in dimensions. This was found to be possible through a coalescence step performed at temperatures above glass transition temperature. For instance, as evident from FIG. 1, glass useful in carry out the present invention undergoes glass transition ($T_g$) before significant crystallization occurs ($T_x$) as evidenced by the existence of endotherm ($T_g$) at lower temperature than exotherm ($T_x$). This allows for bulk fabrication of articles of any dimensions from relatively small pieces of glass. More specifically, for example, an article according to the present invention, can be provided by heating, for example, glass particles (including beads and microspheres), fibers, etc. useful in carrying out the present invention above the $T_g$ such that the glass particles, etc. coalesce to form a shape and cooling the coalesced shape to provide the article. In certain embodiments, heating is conducted at at least one temperature in a range of about 725° C. to about 1100° C.

Surprisingly, for certain embodiments according to the present invention, coalescence may be conducted at temperatures significantly higher than crystallization temperature ($T_x$). Although not wanting to be bound by theory, it s is believed the relatively slow kinetics of crystallization allow access to higher temperatures for viscous flow. Typically, the glass is under pressure during coalescence to aid the coalescence of the glass. In one embodiment, a charge of the glass particles, etc. is placed into a die and hot-pressing is performed at temperatures above glass transition where viscous flow of glass leads to coalescence into a relatively large part. Typically, the amorphous material is under pressure (e.g., greater than zero to 1 GPa or more) during coalescence to aid the coalescence of the amorphous material. It is also within the scope of the present invention to conduct additional coalescence to further improve desirable properties of the article. For example, hot-isostatic pressing may be conducted (e.g., at temperatures from about 900° C. to about 1400° C.) to remove residual porosity, increasing the density of the material. It is also within the scope of the present invention to coalesce glass via hot-isostatic pressing, hot extrusion, or other pressure assisted techniques.

Heat-treatment can be carried out in any of a variety of ways, including those known in the art for heat-treating glass to provide glass-ceramics. For example, heat-treatment can be conducted in batches, for example, using resistive, inductively or gas heated furnaces. Alternatively, for example, heat-treatment can be conducted continuously, for example, using rotary kilns. In the case of a rotary kiln, the material is fed directly into a kiln operating at the elevated temperature. The time at the elevated temperature may range from a few seconds (in some embodiments even less than 5 seconds) to a few minutes to several hours. The temperature may range anywhere from 900° C. to 1600° C., typically between 1200° C. to 1500° C. It is also within the scope of the present invention to perform some of the heat-treatment in batches (e.g., for the nucleation step) and another continuously (e.g., for the crystal growth step and to achieve the desired density). For the nucleation step, the temperature typically ranges between about 900° C. to about 1100° C., in some embodiments, preferably in a range from about 925° C. to about 1050° C. Likewise for the density step, the temperature typically is in a range from about 1100° C. to about 1600° C., in some embodiments, preferably in a range from about 1200° C. to about 1500° C. This heat treatment may occur, for example, by feeding the material directly into a furnace at the elevated temperature. Alternatively, for example, the material may be feed into a furnace at a much lower temperature (e.g., room temperature) and then heated to desired temperature at a predetermined heating rate. It is within the scope of the present invention to conduct heat-treatment in an atmosphere other than air. In some cases it might be even desirable to heat-treat in a reducing atmosphere(s). Also, for example, it may be desirable to heat-treat under gas pressure as in, for example, hot-isostatic press, or in gas pressure furnace.

Sources, including commercial sources, of metal oxides such as $Al_2O_3$, BaO, CaO, rare earth oxides (e.g., $CeO_2$, $Dy_2O_3$, $Er_2O_3$, $Eu_2O_3$, $Gd_2O_3$, $Ho_2O_3$, $La_2O_3$, $Lu_2O_3$, $Nd_2O_3$, $Pr_6O_{11}$, $Sm_2O_3$, $Th_4O_7$, $Tm_2O_3$, and $Yb_2O_3$, and combinations thereof), $TiO_2$, $ZrO_2$ are known in the art. For example sources of (on a theoretical oxide basis) $Al_2O_3$ include bauxite (including both natural occurring bauxite and synthetically produced bauxite), calcined bauxite, hydrated aluminas (e.g., boehmite, and gibbsite), aluminum, Bayer process alumina, aluminum ore, gamma alumina, alpha alumina, aluminum salts, aluminum nitrates, and combinations thereof. The $Al_2O_3$ source may contain, or only provide, $Al_2O_3$. Alternatively, the $Al_2O_3$ source may contain, or provide $Al_2O_3$, as well as one or more metal oxides other than $Al_2O_3$ (including materials of or containing complex $Al_2O_3$ metal oxides (e.g., $Dy_3Al_5O_{12}$, $Y_3Al_5O_{12}$, $CeAl_{11}O_{18}$, etc.).

Sources, including commercial sources, of rare earth oxides include rare earth oxide powders, rare earth metals, rare earth-containing ores (e.g., bastnasite and monazite), rare earth salts, rare earth nitrates, and rare earth carbonates. The rare earth oxide(s) source may contain, or only provide, rare earth oxide(s). Alternatively, the rare earth oxide(s) source may contain, or provide rare earth oxide(s), as well as one or more metal oxides other than rare earth oxide(s) (including materials of or containing complex rare earth oxides (e.g., $Dy_3Al_5O_{12}$, $CeAl_{11}O_{18}$, etc.).

Sources, including commercial sources, of (on a theoretical oxide basis) $ZrO_2$ include zirconium oxide powders, zircon sand, zirconium, zirconium-containing ores, and zirconium salts (e.g., zirconium carbonates, acetates, nitrates, chlorides, hydroxides, and combinations thereof). In addition, or alternatively, the $ZrO_2$ source may contain, or provide $ZrO_2$, as well as other metal oxides such as hafnia. Sources, including commercial sources, of (on a theoretical oxide basis) $HfO_2$ include hafnium oxide powders, hafnium, hafnium-containing ores, and hafnium salts. In addition, or alternatively, the $HfO_2$ source may contain, or provide $HfO_2$, as well as other metal oxides such as $ZrO_2$.

Sources, including commercial sources, of BaO include barium oxide powders, barium-containing ores, barium salts, barium nitrates, and barium carbonates. The barium oxide source may contain, or only provide, barium oxide. Alternatively, the barium oxide source may contain, or provide barium oxide, as well as one or more metal oxides other than barium oxide (including materials of or containing complex barium oxide).

Sources, including commercial sources, of CaO include calcium oxide powders and calcium-containing ores. The calcium oxide(s) source may contain, or only provide, calcium oxide. Alternatively, the calcium oxide source may contain, or provide calcium oxide, as well as one or more metal oxides other than calcium oxide (including materials of or containing complex calcium oxide).

Sources, including commercial sources, of rare earth oxides include rare earth oxide powders, rare earth metals, rare earth-containing ores (e.g., bastnasite and monazite), rare earth salts, rare earth nitrates, and rare earth carbonates. The rare earth oxide(s) source may contain, or only provide, rare earth oxide(s). Alternatively, the rare earth oxide(s) source may contain, or provide rare earth oxide(s), as well as one or more metal oxides other than rare earth oxide(s) (including materials of or containing complex rare earth oxides (e.g., $Dy_3Al_5O_{12}$, $CeAl_{11}O_{18}$, etc.).

Sources, including commercial sources, of $SiO_2$ include silica powders, silicon metals, silicon-containing ores. The silicon oxide source may contain, or only provide, silicon oxide. Alternatively, the silicon oxide source may contain, or provide silicon oxide, as well as one or more metal oxides other than silicon oxide (including materials of or containing complex silicon oxide).

Sources, including commercial sources, of SrO include strontium oxide powders, strontium carbonates, and strontium-containing ores. The strontium oxide source may contain, or only provide, strontium oxide. Alternatively, the strontium oxide source may contain, or provide strontium oxide, as well as one or more metal oxides other than strontium oxide (including materials of or containing complex strontium oxide).

Sources, including commercial sources, of $TiO_2$ include titanium oxide powders, titanium metals and titanium-containing ores. The titanium oxide source may contain, or only provide, titanium oxide. Alternatively, the titanium oxide source may contain, or provide titanium oxide, as well as one or more metal oxides other than titanium oxide (including materials of or containing complex titanium oxide).

Sources, including commercial sources, of (on a theoretical oxide basis) $ZrO_2$ include zirconium oxide powders, zircon sand, zirconium, zirconium-containing ores, and zirconium salts (e.g., zirconium carbonates, acetates, nitrates, chlorides, hydroxides, and combinations thereof). In addition, or alternatively, the $ZrO_2$ source may contain, or provide $ZrO_2$, as well as other metal oxides such as hafnia. Sources, including commercial sources, of (on a theoretical oxide basis) $HfO_2$ include hafnium oxide powders, hafnium, hafnium-containing ores, and hafnium salts. In addition, or alternatively, the $HfO_2$ source may contain, or provide $HfO_2$, as well as other metal oxides such as $ZrO_2$.

Optionally, ceramics according to the present invention further comprise additional metal oxides beyond those needed for the general composition. The addition of certain metal oxides may alter the properties and/or the crystalline structure or microstructure of ceramics made according to the present invention, as well as the processing of the raw materials and intermediates in making the ceramic. For example, oxide additions such as MgO, CaO, $Li_2O$, and $Na_2O$ have been observed to alter both the $T_g$ and $T_x$ of glass. Although not wishing to be bound by theory, it is believed that such additions influence glass formation. Further, for example, such oxide additions may decrease the melting temperature of the overall system (i.e., drive the system toward lower melting eutectic), and ease of glass-formation. Complex eutectics in multi component systems (quaternary, etc.) may result in better glass-forming ability. The viscosity of the liquid melt and viscosity of the glass in its' "working" range may also be affected by the addition of metal oxides beyond those needed for the general composition.

In some instances, it may be preferred to incorporate limited amounts of metal oxides selected from the group consisting of: $Na_2O$, $P_2O_5$, $SiO_2$, $TeO_2$, $V_2O_3$, and combinations thereof. Sources, including commercial sources, include the oxides themselves, complex oxides, ores, carbonates, acetates, nitrates, chlorides, hydroxides, etc. These metal oxides may be added, for example, to modify a physical property of the resulting abrasive particles and/or improve processing. These metal oxides when used are typically are added from greater than 0 to 20% by weight, preferably greater than 0 to 5% by weight and more preferably greater than 0 to 2% by weight of the glass-ceramic depending, for example, upon the desired property.

Further other glass compositions which may be used in conjunction with the required glass(es) for carrying out the present invention include those conventional glasses that are well known in the art, including sources thereof.

For glasses that devitrify to form glass-ceramics, crystallization may also be affected by the additions of materials beyond those needed for the general composition. For example, certain metals, metal oxides (e.g., titanates and zirconates), and fluorides, for example, may act as nucleation agents resulting in beneficial heterogeneous nucleation of crystals. Also, addition of some oxides may change nature of metastable phases devitrifying from the glass upon reheating. In another aspect, for ceramics according to the present invention comprising crystalline $ZrO_2$, it may be desirable to add metal oxides (e.g., $Y_2O_3$, $TiO_2$, CaO, and MgO) that are known to stabilize tetragonal/cubic form of $ZrO_2$.

Examples of optional metal oxides (i.e., metal oxides beyond those needed for the general composition) may include, on a theoretical oxide basis, $Al_2O_3$, BaO, CaO, $Cr_2O_3$, CoO, $Fe_2O_3$, $GeO_2$, $HfO_2$, $Li_2O$, MgO, MnO, NiO, $Na_2O$, $P_2O_5$, rare earth oxides, $Sc_2O_3$, $SiO_2$, SrO, $TeO_2$, $TiO_2$, $V_2O_3$, $Y_2O_3$, ZnO, $ZrO_2$, and combinations thereof. Sources, including commercial sources, include the oxides themselves, complex oxides, ores, carbonates, acetates, nitrates, chlorides, hydroxides, etc. Further, for example, with regard to $Y_2O_3$, sources, including commercial sources, of (on a theoretical oxide basis) $Y_2O_3$ include yttrium oxide powders, yttrium, yttrium-containing ores, and yttrium salts (e.g., yttrium carbonates, nitrates, chlorides, hydroxides, and combinations thereof). The $Y_2O_3$ source may contain, or only provide, $Y_2O_3$. Alternatively, the $Y_2O_3$ source may contain, or provide $Y_2O_3$, as well as one or more metal oxides other than $Y_2O_3$ (including materials of or containing complex $Y_2O_3$ (e.g., $Y_3Al_5O_{12}$).

In some embodiments, it may be advantageous for at least a portion of a metal oxide source (in some embodiments, preferably, 10 15, 20, 25, 30, 35, 40, 45, 50, 55, 60, 65, 70, 75, 80, 85, 90, or even at least 95 percent by weight) to be obtained by adding particulate, metallic material comprising at least one of a metal (e.g., Al, Ca, Cu, Cr, Fe, Li, Mg, Ni, Ag, Ti, Zr, and combinations thereof), M, that has a negative enthalpy of oxide formation or an alloy thereof to the melt, or otherwise metal them with the other raw materials. Although not wanting to be bound by theory, it is believed that the heat resulting from the exothermic reaction associated with the oxidation of the metal is beneficial in the formation of a homogeneous melt and resulting amorphous material. For example, it is believed that the additional heat generated by the oxidation reaction within the raw material eliminates or minimizes insufficient heat transfer, and hence facilitates formation and homogeneity of the melt, particularly when forming amorphous particles with x, y, and z dimensions over 150 micrometers. It is also believed that the availability of the additional heat aids in driving various chemical reactions and physical processes (e.g., densification, and spherodization) to completion. Further, it is believed for some embodiments, the presence of the additional heat generated by the oxidation reaction actually enables the formation of a melt, which otherwise is difficult or otherwise not practical due to high melting point of the materials. Further, the presence of the additional heat generated by the oxidation reaction actually enables the formation of amorphous material that otherwise could not be made, or could not be made in the desired size range. Another advantage of the invention include, in forming the amorphous materials, that many of the chemical and physical processes such as melting, densification and spherodizing can be achieved in a short time, so that very high quench rates be can achieved. For additional details, see copending application having U.S. Ser. No. 10/211,639, filed the same date as the instant application, the disclosure of which is incorporated herein by reference.

The particular selection of metal oxide sources and other additives for making ceramics according to the present invention typically takes into account, for example, the desired composition and microstructure of the resulting ceramics, the desired degree of crystallinity, if any, the desired physical properties (e.g., hardness or toughness) of the resulting ceramics, avoiding or minimizing the presence of undesirable impurities, the desired characteristics of the resulting ceramics, and/or the particular process (including equipment and any purification of the raw materials before and/or during fusion and/or solidification) being used to prepare the ceramics.

The metal oxide sources and other additives can be in any form suitable to the process and equipment utilized for the present invention. The raw materials can be melted and quenched using techniques and equipment known in the art for making oxide glasses and amorphous metals. Desirable cooling rates include those of 50 K/s and greater. Cooling techniques known in the art include roll-chilling. Roll-chilling can be carried out, for example, by melting the metal oxide sources at a temperature typically 20-200° C. higher than the melting point, and cooling/quenching the melt by spraying it under high pressure (e.g., using a gas such as air, argon, nitrogen or the like) onto a high-speed rotary roll(s). Typically, the rolls are made of metal and are water cooled. Metal book molds may also be useful for cooling/quenching the melt.

Other techniques for forming melts, cooling/quenching melts, and/or otherwise forming glass include vapor phase quenching, plasma spraying, melt-extraction, and gas atomization. Vapor phase quenching can be carried out, for example, by sputtering, wherein the metal alloys or metal oxide sources are formed into a sputtering target(s) which are used. The target is fixed at a predetermined position in a sputtering apparatus, and a substrate(s) to be coated is placed at a position opposing the target(s). Typical pressures of $10^{-3}$ torr of oxygen gas and Ar gas, discharge is generated between the target(s) and a substrate(s), and Ar or oxygen ions collide against the target to start reaction sputtering, thereby depositing a film of composition on the substrate. For additional details regarding plasma spraying, see, for example, copending application having U.S. Ser. No. 10/211,640, filed the same date as the instant application, the disclosure of which is incorporated herein by reference.

Gas atomization involves melting feed particles to convert them to melt. A thin stream of such melt is atomized through contact with a disruptive air jet (i.e., the stream is divided into fine droplets). The resulting substantially discrete, generally ellipsoidal glass particles are then recovered. Melt-extraction can be carried out, for example, as disclosed in U.S. Pat. No. 5,605,870 (Strom-Olsen et al.), the disclosure of which is incorporated herein by reference. Containerless glass forming techniques utilizing laser beam heating as disclosed, for example, in PCT application having Publication No. WO 01/27046A1, published Apr. 4, 2001, the disclosure of which is incorporated herein by reference, may also be useful in making glass according to the present invention.

The cooling rate is believed to affect the properties of the quenched amorphous material. For instance, glass transition temperature, density and other properties of glass typically change with cooling rates.

Rapid cooling may also be conducted under controlled atmospheres, such as a reducing, neutral, or oxidizing environment to maintain and/or influence the desired oxidation states, etc. during cooling. The atmosphere can also influence glass formation by influencing crystallization kinetics from undercooled liquid. For example, larger undercooling of $Al_2O_3$ melts without crystallization has been reported in argon atmosphere as compared to that in air.

With regard to making particles, for example, the resulting ceramic (e.g., glass or ceramic comprising glass may be larger in size than that desired. The ceramic can be, and typically is, converted into smaller pieces using crushing and/or comminuting techniques known in the art, including roll crushing, canary milling, jaw crushing, hammer milling, ball milling, jet milling, impact crushing, and the like. In some instances, it is desired to have two or multiple crushing steps. For example, after the ceramic is formed (solidified), it may be in the form larger than desired. The first crushing step may involve crushing these relatively large masses or "chunks" to form smaller pieces. This crushing of these chunks may be accomplished with a hammer mill, impact crusher or jaw crusher. These smaller pieces may then be subsequently crushed to produce the desired particle size distribution. In order to produce the desired particle size distribution (sometimes referred to as grit size or grade), it may be necessary to perform multiple crushing steps. In general the crushing conditions are optimized to achieve the desired particle shape(s) and particle size distribution.

The shape of particles can depend, for example, on the composition of the glass, the geometry in which it was cooled, and the manner in which the glass is crushed (i.e., the crushing technique used), if the particles were formed by crushing.

Certain articles according to the present invention comprising glass can be heat-treated to increase or at least partially crystallize the glass (including crystallize the glass) to provide glass-ceramic. The heat-treatment of certain glasses to form glass-ceramics is well known in the art. The heating conditions to nucleate and grow glass-ceramics are known for a variety of glasses. Alternatively, one skilled in the art can determine the appropriate conditions from a Time-Temperature-Transformation (TTT) study of the glass using techniques known in the art. One skilled in the art, after reading the disclosure of the present invention should be able to provide TTT curves for glasses according to the present invention, determine the appropriate nucleation and/or crystal growth conditions to provide crystalline ceramics, glass-ceramics, and ceramic comprising glass according to the present invention.

Typically, glass-ceramics are stronger than the glasses from which they are formed. Hence, the strength of the material may be adjusted, for example, by the degree to which the glass is converted to crystalline ceramic phase(s). Alternatively, or in addition, the strength of the material may also be affected, for example, by the number of nucleation sites created, which may in turn be used to affect the number, and in turn the size of the crystals of the crystalline phase(s). For additional details regarding forming glass-ceramics, see, for example *Glass-Ceramics*, P. W. McMillan, Academic Press, Inc., $2^{nd}$ edition, 1979, the disclosure of which is incorporated herein by reference.

For example, during heat-treatment of a glass such as a glass comprising $Al_2O_3$, $La_2O_3$, and $ZrO_2$ formation of phases such as $La_2Zr_2O_7$, and, if $ZrO_2$ is present, cubic/tetragonal $ZrO_2$, in some cases monoclinic $ZrO_2$, have been observed at temperatures above about 900° C. Although not wanting to be bound by theory, it is believed that zirconia-related phases are the first phases to nucleate from the glass. For example, of $Al_2O_3$, $ReAlO_3$ (wherein Re is at least one rare earth cation), $ReAl_{11}O_{18}$, $Re_3Al_5O_{12}$, $Y_3Al_5O_{12}$, etc. phases are believed to generally occur at temperatures above about 925° C. Crystallite size during this nucleation step may be on the order of nanometers. For example, crystals as small as 10-15 nanometers have been observed. Longer heat-treating temperatures typically lead to the growth of crystallites and progression of crystallization. For at least some embodiments, heat-treatment at about 1300° C. for about 1 hour provides a full crystallization.

Certain ceramic articles made according to the present invention contain less than less than 20% by weight $SiO_2$ (or even less than 15%, less than 10%, less than, 5% by weight, or even zero percent, by weight, $SiO_2$), less than 20% by weight $B_2O_3$ (or even less than 15%, less than 10%, less than, 5% by weight, or even zero percent, by weight, $B_2O_3$), and less than 40% by weight $P_2O_5$ (or even less than 35%, less than 30%, less than 25%, less than 20%, less than 15%, less than 10%, less than, 5% by weight, or even zero percent, by weight, $P_2O_5$), based on the total metal oxide weight of the ceramic.

The microstructure or phase composition (glassy/amorphous/crystalline) of a material can be determined in a number of ways. Various information can be obtained using optical microscopy, electron microscopy, differential thermal analysis (DTA), and x-ray diffraction (XRD), for example.

Using optical microscopy, amorphous material is typically predominantly transparent due to the lack of light scattering centers such as crystal boundaries, while crystalline material shows a crystalline structure and is opaque due to light scattering effects.

Using DTA, the material is classified as amorphous if the corresponding DTA trace of the material contains an exothermic crystallization event ($T_x$). If the same trace also contains an endothermic event ($T_g$) at a temperature lower than $T_x$ it is considered to consist of a glass phase. If the DTA trace of the material contains no such events, it is considered to contain crystalline phases.

Differential thermal analysis (DTA) can be conducted using the following method. DTA runs can be made (using an instrument such as that obtained from Netzsch Instruments, Selb, Germany under the trade designation "NETZSCH STA 409 DTA/TGA") using a—140+170 mesh size fraction (i.e., the fraction collected between 105-micrometer opening size and 90-micrometer opening size screens). An amount of each screened sample (typically about 400 milligrams (mg)) is placed in a 100-microliter $Al_2O_3$ sample holder. Each sample is heated in static air at a rate of 10° C./minute from room temperature (about 25° C.) to 1100° C.

Using powder x-ray diffraction, XRD, (using an x-ray diffractometer such as that obtained under the trade designation "PHILLIPS XRG 3100" from Phillips, Mahwah, N.J., with copper K α1 radiation of 1.54050 Angstrom) the phases present in a material can be determined by comparing the peaks present in the XRD trace of the crystallized material to XRD patterns of crystalline phases provided in JCPDS (Joint Committee on Powder Diffraction Standards) databases, published by International Center for Diffraction Data. Furthermore, an XRD can be used qualitatively to determine types of phases. The presence of a broad diffused intensity peak is taken as an indication of the amorphous nature of a material.

The existence of both a broad peak and well-defined peaks is taken as an indication of existence of crystalline matter within an amorphous matrix. The initially formed amorphous material or ceramic (including glass prior to crystallization) may be larger in size than that desired. The amorphous material or ceramic can be converted into smaller pieces using crushing and/or comminuting techniques known in the art, including roll crushing, canary milling, jaw crushing, hammer milling, ball milling, jet milling, impact crushing, and the like. In some instances, it is desired to have two or multiple crushing steps. For example, after the ceramic is formed (solidified), it may be in the form of larger than desired. The first crushing step may involve crushing these relatively large masses or "chunks" to form smaller pieces. This crushing of these chunks may be accomplished with a hammer mill, impact crusher or jaw crusher. These smaller pieces may then be subsequently crushed to produce the desired particle size distribution. In order to produce the desired particle size distribution (sometimes referred to as grit size or grade), it may be necessary to perform multiple crushing steps. In general the crushing conditions are optimized to achieve the desired particle shape(s) and particle size distribution. Resulting particles that are of the desired size may be recrushed if they are too large, or "recycled" and used as a raw material for re-melting if they are too small.

The shape of particles can depend, for example, on the composition and/or microstructure of the ceramic, the geometry in which it was cooled, and the manner in which the ceramic is crushed (i.e., the crushing technique used). In general, where a "blocky" shape is preferred, more energy may be employed to achieve this shape. Conversely, where a "sharp" shape is preferred, less energy may be employed to achieve this shape. The crushing technique may also be changed to achieve different desired shapes. For some particles an average aspect ratio ranging from 1:1 to 5:1 is typically desired, and in some embodiments 1.25:1 to 3:1, or even 1.5:1 to 2.5:1.

Ceramic articles (including glass-ceramics) made according to the present invention may comprise at least 1, 2, 3, 5, 10, 15, 20, 25, 30, 35, 40, 45, 50, 55, 60, 65, 70, 75, 80, 85, 90, 95, 97, 98, 99, or even 100 percent by volume crystallites, wherein the crystallites have an average size of less than 1 micrometer. In another aspect, ceramic articles (including glass-ceramics) made according to the present invention may comprise less than at least 1, 2, 3, 5, 10, 15, 20, 25, 30, 35, 40, 45, 50, 55, 60, 65, 70, 75, 80, 85, 90, 95, 97, 98, 99, or even 100 percent by volume crystallites, wherein the crystallites have an average size of less than 0.5 micrometer. In another aspect, ceramics (including glass-ceramics) according to the present invention comprise less than at least 1, 2, 3, 5, 10, 15, 20, 25, 30, 35, 40, 45, 50, 55, 60, 65, 70, 75, 80, 85, 90, 95, 97, 98, 99, or even 100 percent by volume crystallites, wherein the crystallites have an average size of less than 0.3 micrometer. In another aspect, ceramic articles (including glass-ceramics) made according to the present invention may comprise less than at least 1, 2, 3, 5, 10, 15, 20, 25, 30, 35, 40, 45, 50, 55, 60, 65, 70, 75, 80, 85, 90, 95, 97, 98, 99, or even 100 percent by volume crystallites, wherein the crystallites have an average size of less than 0.15 micrometer. In another aspect, ceramic articles (including glass-ceramics) made according to the present invention may be free of at least one of eutectic microstructure features (i.e., is free of colonies and lamellar structure) or a non-cellular microstructure.

In another aspect, certain ceramic articles made according to the present invention may comprise, for example, at least 1, 2, 3, 5, 10, 15, 20, 25, 30, 35, 40, 45, 50, 55, 60, 65, 70, 75, 80, 85, 90, 95, or even 100 percent by volume glass. In another aspect, certain ceramic articles made according to the present invention may comprise, for example, 100 or at least 1, 2, 3, 5, 10, 15, 20, 25, 30, 35, 40, 45, 50, 55, 60, 65, 70, 75, 80, 85, 90, 95, 97, 98, 99, or even 100 percent by volume crystalline ceramic.

Certain articles made according to the present invention comprise glass comprising CaO and $Al_2O_3$, wherein at least 80 (85, 90, 95, 97, 98, 99, or even 100) percent by weight of the glass collectively comprises the CaO and $Al_2O_3$, based on the total weight of the glass.

In another aspect, certain articles made according to the present invention provides a ceramic comprising glass (e.g., at least 5, 10, 15, 20, 25, 30, 35, 40, 45, 50, 55, 60, 65, 70, 75, 80, 85, 90, 95, 97, 98, 99, or even 100 percent by volume glass), the glass comprising CaO and $Al_2O_3$, wherein at least 80 (85, 90, 95, 97, 98, 99, or even 100) percent by weight of the glass collectively comprises the CaO and $Al_2O_3$, based on the total weight of the glass.

In another aspect, certain articles made according to the present invention provides glass-ceramic comprising CaO and $Al_2O_3$, wherein at least 80 (85, 90, 95, 97, 98, 99, or even 100) percent by weight of the glass-ceramic collectively comprises CaO and $Al_2O_3$, based on the total weight of the glass-ceramic. The glass-ceramic may comprise, for example, at least 1, 2, 3, 5, 10, 15, 20, 25, 30, 35, 40, 45, 50, 55, 60, 65, 70, 75, 80, 85, 90, or 95 percent by volume glass. The glass-ceramic may comprise, for example, at least 99, 98, 97, 95, 90, 85, 80, 75, 70, 65, 60, 55, 50, 45, 40, 35, 30, 25, 20, 15, 10, or 5 percent by volume crystalline ceramic.

In another aspect, certain articles made according to the present invention provides a ceramic comprising crystalline ceramic (e.g., at least 1, 2, 3, 5, 10, 15, 20, 25, 30, 35, 40, 45, 50, 55, 60, 65, 70, 75, 80, 85, 90, 95, 97, 98, 99, or even 100 percent by volume crystalline ceramic), the crystalline ceramic comprising, wherein at least 80 (85, 90, 95, 97, 98, 99, or even 100) percent by weight of the crystalline ceramic collectively comprises the CaO and $Al_2O_3$, based on the total weight of the crystalline ceramic. The ceramic may comprise, for example, at least 99, 98, 97, 95, 90, 85, 80, 75, 70, 65, 60, 55, 50, 45, 40, 35, 30, 25, 20, 15, 10, 5, 3, 2, or 1 percent by volume glass.

In another aspect, certain articles made according to the present invention provides a ceramic comprising crystalline ceramic (e.g., at least 1, 2, 3, 5, 10, 15, 20, 25, 30, 35, 40, 45, 50, 55, 60, 65, 70, 75, 80, 85, 90, 95, 97, 98, 99, or even 100 percent by volume crystalline ceramic), the ceramic comprising CaO and $Al_2O_3$, wherein at least 80 (85, 90, 95, 97, 98, 99, or even 100) percent by weight of the ceramic collectively comprises CaO and $Al_2O_3$, based on the total weight of the ceramic. The ceramic may comprise, for example, at least 99, 98, 97, 95, 90, 85, 80, 75, 70, 65, 60, 55, 50, 45, 40, 35, 30, 25, 20, 15, 10, 5, 3, 2, or 1 percent by volume glass.

Certain articles made according to the present invention comprise glass comprising CaO, $Al_2O_3$, and $ZrO_2$, wherein at least 80 (85, 90, 95, 97, 98, 99, or even 100) percent by weight of the glass collectively comprises the CaO, $Al_2O_3$, and $ZrO_2$, based on the total weight of the glass.

In another aspect, certain articles made according to the present invention provides a ceramic comprising glass (e.g., at least 5, 10, 15, 20, 25, 30, 35, 40, 45, 50, 55, 60, 65, 70, 75, 80, 85, 90, 95, 97, 98, 99, or even 100 percent by volume glass), the glass comprising CaO, $Al_2O_3$, and $ZrO_2$, wherein at least 80 (85, 90, 95, 97, 98, 99, or even 100) percent by weight of the glass collectively comprises the CaO and $Al_2O_3$, and $ZrO_2$, based on the total weight of the glass.

In another aspect, certain articles made according to the present invention provides glass-ceramic comprising CaO, $Al_2O_3$, and $ZrO_2$, wherein at least 80 (85, 90, 95, 97, 98, 99, or even 100) percent by weight of the glass-ceramic collectively comprises the CaO, $Al_2O_3$, and $ZrO_2$, based on the total weight of the glass-ceramic. The glass-ceramic may comprise, for example, at least 1, 2, 3, 5, 10, 15, 20, 25, 30, 35, 40, 45, 50, 55, 60, 65, 70, 75, 80, 85, 90, or 95 percent by volume glass. The glass-ceramic may comprise, for example, at least 99, 98, 97, 95, 90, 85, 80, 75, 70, 65, 60, 55, 50, 45, 40, 35, 30, 25, 20, 15, 10, or 5 percent by volume crystalline ceramic.

In another aspect, certain articles made according to the present invention provides a ceramic comprising crystalline ceramic (e.g., at least 1, 2, 3, 5, 10, 15, 20, 25, 30, 35, 40, 45, 50, 55, 60, 65, 70, 75, 80, 85, 90, 95, 97, 98, 99, or even 100 percent by volume crystalline ceramic), the crystalline ceramic comprising, wherein at least 80 (85, 90, 95, 97, 98, 99, or even 100) percent by weight of the crystalline ceramic collectively comprises the CaO, $Al_2O_3$, and $ZrO_2$, based on the total weight of the crystalline ceramic. The ceramic may comprise, for example, at least 99, 98, 97, 95, 90, 85, 80, 75, 70, 65, 60, 55, 50, 45, 40, 35, 30, 25, 20, 15, 10, 5, 3, 2, or 1 percent by volume glass.

In another aspect, certain articles made according to the present invention provides a ceramic comprising crystalline ceramic (e.g., at least 1, 2, 3, 5, 10, 15, 20, 25, 30, 35, 40, 45, 50, 55, 60, 65, 70, 75, 80, 85, 90, 95, 97, 98, 99, or even 100 percent by volume crystalline ceramic), the ceramic comprising CaO, $Al_2O_3$, and $ZrO_2$, wherein at least 80 (85, 90, 95, 97, 98, 99, or even 100) percent by weight of the ceramic collectively comprises CaO, $Al_2O_3$, and $ZrO_2$, based on the total weight of the ceramic. The ceramic may comprise, for example, at least 99, 98, 97, 95, 90, 85, 80, 75, 70, 65, 60, 55, 50, 45, 40, 35, 30, 25, 20, 15, 10, 5, 3, 2, or 1 percent by volume glass.

Certain articles made according to the present invention comprise glass comprising BaO and $TiO_2$, wherein at least 80 (85, 90, 95, 97, 98, 99, or even 100) percent by weight of the glass collectively comprises the BaO and $TiO_2$, based on the total weight of the glass.

In another aspect, certain articles made according to the present invention provides a ceramic comprising glass (e.g., at least 5, 10, 15, 20, 25, 30, 35, 40, 45, 50, 55, 60, 65, 70, 75, 80, 85, 90, 95, 97, 98, 99, or even 100 percent by volume glass), the glass comprising BaO and $TiO_2$, wherein at least 80 (85, 90, 95, 97, 98, 99, or even 100) percent by weight of the glass collectively comprises the BaO and $TiO_2$, based on the total weight of the glass.

In another aspect, certain articles made according to the present invention provides glass-ceramic comprising BaO and $TiO_2$, wherein at least 80 (85, 90, 95, 97, 98, 99, or even 100) percent by weight of the glass-ceramic collectively comprises the BaO and $TiO_2$, based on the total weight of the glass-ceramic. The glass-ceramic may comprise, for example, at least 1, 2, 3, 5, 10, 15, 20, 25, 30, 35, 40, 45, 50, 55, 60, 65, 70, 75, 80, 85, 90, or 95 percent by volume glass. The glass-ceramic may comprise, for example, at least 99, 98, 97, 95, 90, 85, 80, 75, 70, 65, 60, 55, 50, 45, 40, 35, 30, 25, 20, 15, 10, or 5 percent by volume crystalline ceramic.

In another aspect, certain articles made according to the present invention provides a ceramic comprising crystalline ceramic (e.g., at least 1, 2, 3, 5, 10, 15, 20, 25, 30, 35, 40, 45, 50, 55, 60, 65, 70, 75, 80, 85, 90, 95, 97, 98, 99, or even 100 percent by volume crystalline ceramic), the crystalline ceramic comprising, wherein at least 80 (85, 90, 95, 97, 98, 99, or even 100) percent by weight of the crystalline ceramic collectively comprises the BaO and $TiO_2$, based on the total weight of the crystalline ceramic. The ceramic may comprise, for example, at least 99, 98, 97, 95, 90, 85, 80, 75, 70, 65, 60, 55, 50, 45, 40, 35, 30, 25, 20, 15, 10, 5, 3, 2, or 1 percent by volume glass.

In another aspect, certain articles made according to the present invention provides a ceramic comprising crystalline ceramic (e.g., at least 1, 2, 3, 5, 10, 15, 20, 25, 30, 35, 40, 45, 50, 55, 60, 65, 70, 75, 80, 85, 90, 95, 97, 98, 99, or even 100 percent by volume crystalline ceramic), the ceramic comprising BaO and $TiO_2$, wherein at least 80 (85, 90, 95, 97, 98, 99, or even 100) percent by weight of the ceramic collectively comprises BaO and $TiO_2$, based on the total weight of the ceramic. The ceramic may comprise, for example, at least 99, 98, 97, 95, 90, 85, 80, 75, 70, 65, 60, 55, 50, 45, 40, 35, 30, 25, 20, 15, 10, 5, 3, 2, or 1 percent by volume glass.

Certain articles made according to the present invention comprise glass comprising $La_2O_3$ and $TiO_2$, wherein at least 80 (85, 90, 95, 97, 98, 99, or even 100) percent by weight of the glass collectively comprises the $La_2O_3$ and $TiO_2$, based on the total weight of the glass.

In another aspect, certain articles made according to the present invention provides a ceramic comprising glass (e.g., at least 5, 10, 15, 20, 25, 30, 35, 40, 45, 50, 55, 60, 65, 70, 75, 80, 85, 90, 95, 97, 98, 99, or even 100 percent by volume glass), the glass comprising $La_2O_3$ and $TiO_2$, wherein at least 80 (85, 90, 95, 97, 98, 99, or even 100) percent by weight of the glass collectively comprises the $La_2O_3$ and $TiO_2$, based on the total weight of the glass.

In another aspect, certain articles made according to the present invention provides glass-ceramic comprising $La_2O_3$ and $TiO_2$, wherein at least 80 (85, 90, 95, 97, 98, 99, or even 100) percent by weight of the glass-ceramic collectively comprises the $La_2O_3$ and $TiO_2$, based on the total weight of the glass-ceramic. The glass-ceramic may comprise, for example, at least 1, 2, 3, 5, 10, 15, 20, 25, 30, 35, 40, 45, 50, 55, 60, 65, 70, 75, 80, 85, 90, or 95 percent by volume glass. The glass-ceramic may comprise, for example, at least 99, 98, 97, 95, 90, 85, 80, 75, 70, 65, 60, 55, 50, 45, 40, 35, 30, 25, 20, 15, 10, or 5 percent by volume crystalline ceramic.

In another aspect, certain articles made according to the present invention provides a ceramic comprising crystalline ceramic (e.g., at least 1, 2, 3, 5, 10, 15, 20, 25, 30, 35, 40, 45, 50, 55, 60, 65, 70, 75, 80, 85, 90, 95, 97, 98, 99, or even 100 percent by volume crystalline ceramic), the crystalline ceramic comprising, wherein at least 80 (85, 90, 95, 97, 98, 99, or even 100) percent by weight of the crystalline ceramic collectively comprises the $La_2O_3$ and $TiO_2$, based on the total weight of the crystalline ceramic. The ceramic may comprise, for example, at least 99, 98, 97, 95, 90, 85, 80, 75, 70, 65, 60, 55, 50, 45, 40, 35, 30, 25, 20, 15, 10, 5, 3, 2, or 1 percent by volume glass.

In another aspect, certain articles made according to the present invention provides a ceramic comprising crystalline ceramic (e.g., at least 1, 2, 3, 5, 10, 15, 20, 25, 30, 35, 40, 45, 50, 55, 60, 65, 70, 75, 80, 85, 90, 95, 97, 98, 99, or even 100 percent by volume crystalline ceramic), the ceramic comprising $La_2O_3$ and $TiO_2$, wherein at least 80 (85, 90, 95, 97, 98, 99, or even 100) percent by weight of the ceramic collectively comprises $La_2O_3$ and $TiO_2$, based on the total weight of the ceramic. The ceramic may comprise, for example, at least 99, 98, 97, 95, 90, 85, 80, 75, 70, 65, 60, 55, 50, 45, 40, 35, 30, 25, 20, 15, 10, 5, 3, 2, or 1 percent by volume glass.

Certain articles made according to the present invention comprise glass comprising REO and $Al_2O_3$, wherein at least 80 (85, 90, 95, 97, 98, 99, or even 100) percent by weight of the glass collectively comprises the REO and $Al_2O_3$, based on the total weight of the glass.

In another aspect, certain articles made according to the present invention provides a ceramic comprising glass (e.g., at least 5, 10, 15, 20, 25, 30, 35, 40, 45, 50, 55, 60, 65, 70, 75, 80, 85, 90, 95, 97, 98, 99, or even 100 percent by volume glass), the glass comprising REO and $Al_2O_3$, wherein at least 80 (85, 90, 95, 97, 98, 99, or even 100) percent by weight of the glass collectively comprises the REO and $Al_2O_3$, based on the total weight of the glass.

In another aspect, certain articles made according to the present invention provides glass-ceramic comprising REO and $Al_2O_3$, wherein at least 80 (85, 90, 95, 97, 98, 99, or even 100) percent by weight of the glass-ceramic collectively comprises the REO and $Al_2O_3$, based on the total weight of the glass-ceramic. The glass-ceramic may comprise, for example, at least 1, 2, 3, 5, 10, 15, 20, 25, 30, 35, 40, 45, 50, 55, 60, 65, 70, 75, 80, 85, 90, or 95 percent by volume glass. The glass-ceramic may comprise, for example, at least 99, 98, 97, 95, 90, 85, 80, 75, 70, 65, 60, 55, 50, 45, 40, 35, 30, 25, 20, 15, 10, or 5 percent by volume crystalline ceramic.

In another aspect, the present invention provides glass-ceramic comprising REO and $Al_2O_3$, wherein, for example, glass-ceramic exhibits a microstructure comprising crystallites having an average crystallite size of less than 1 micrometer (typically, less than 500 nanometers, even less than 300, 200, or 150 nanometers; and in some embodiments, less than 100, 75, 50, 25, or 20 nanometers), and (b) is free of at least one of eutectic microstructure features or a non-cellular microstructure. The glass-ceramic may comprise, for example, at least 1, 2, 3, 5, 10, 15, 20, 25, 30, 35, 40, 45, 50, 55, 60, 65, 70, 75, 80, 85, 90, 95, percent by volume glass. The glass-ceramic may comprise, for example, at least 99, 98, 97, 95, 90, 85, 80, 75, 70, 65, 60, 55, 50, 45, 40, 35, 30, 25, 20, 15, 10, or 5 percent by volume crystalline ceramic.

In another aspect, certain articles made according to the present invention provides a ceramic comprising crystalline ceramic (e.g., at least 1, 2, 3, 5, 10, 15, 20, 25, 30, 35, 40, 45, 50, 55, 60, 65, 70, 75, 80, 85, 90, 95, 97, 98, 99, or even 100 percent by volume crystalline ceramic), the crystalline ceramic comprising, wherein at least 80 (85, 90, 95, 97, 98, 99, or even 100) percent by weight of the crystalline ceramic collectively comprises the REO and $Al_2O_3$, based on the total weight of the crystalline ceramic. The ceramic may comprise, for example, at least 99, 98, 97, 95, 90, 85, 80, 75, 70, 65, 60, 55, 50, 45, 40, 35, 30, 25, 20, 15, 10, 5, 3, 2, or 1 percent by volume glass.

In another aspect, certain articles made according to the present invention provides a ceramic comprising crystalline ceramic (e.g., at least 1, 2, 3, 5, 10, 15, 20, 25, 30, 35, 40, 45, 50, 55, 60, 65, 70, 75, 80, 85, 90, 95, 97, 98, 99, or even 100 percent by volume crystalline ceramic), the ceramic comprising REO and $Al_2O_3$, wherein at least 80 (85, 90, 95, 97, 98, 99, or even 100) percent by weight of the ceramic collectively comprises REO and $Al_2O_3$, based on the total weight of the ceramic. The ceramic may comprise, for example, at least 99, 98, 97, 95, 90, 85, 80, 75, 70, 65, 60, 55, 50, 45, 40, 35, 30, 25, 20, 15, 10, 5, 3, 2, or 1 percent by volume glass.

Certain articles made according to the present invention comprise glass comprising REO and $Al_2O_3$, wherein at least 80 (85, 90, 95, 97, 98, 99, or even 100) percent by weight of the glass collectively comprises the REO and $Al_2O_3$, based on the total weight of the glass.

In another aspect, certain articles made according to the present invention provides a ceramic comprising glass (e.g., at least 5, 10, 15, 20, 25, 30, 35, 40, 45, 50, 55, 60, 65, 70, 75, 80, 85, 90, 95, 97, 98, 99, or even 100 percent by volume glass), the glass comprising REO, $Al_2O_3$, and $ZrO_2$, wherein at least 80 (85, 90, 95, 97, 98, 99, or even 100) percent by weight of the glass collectively comprises the REO and $Al_2O_3$ and $ZrO_2$, based on the total weight of the glass.

In another aspect, certain articles made according to the present invention provides glass-ceramic comprising REO, $Al_2O_3$, and $ZrO_2$, wherein at least 80 (85, 90, 95, 97, 98, 99, or even 100) percent by weight of the glass-ceramic collectively comprises the REO and $Al_2O_3$ and $ZrO_2$, based on the total weight of the glass-ceramic. The glass-ceramic may comprise, for example, at least 1, 2, 3, 5, 10, 15, 20, 25, 30, 35, 40, 45, 50, 55, 60, 65, 70, 75, 80, 85, 90, or 95 percent by volume glass. The glass-ceramic may comprise, for example, at least 99, 98, 97, 95, 90, 85, 80, 75, 70, 65, 60, 55, 50, 45, 40, 35, 30, 25, 20, 15, 10, or 5 percent by volume crystalline ceramic.

In another aspect, the present invention provides glass-ceramic comprising REO, $Al_2O_3$, and $ZrO_2$, wherein the glass-ceramic (a) exhibits a microstructure comprising crystallites having an average crystallite size of less than 1 micrometer (typically, less than 500 nanometers, even less than 300, 200, or 150 nanometers; and in some embodiments, less than 100, 75, 50, 25, or 20 nanometers), and (b) is free of at least one of eutectic microstructure features or a non-cellular microstructure. The glass-ceramic may comprise, for example, at least 1, 2, 3, 5, 10, 15, 20, 25, 30, 35, 40, 45, 50, 55, 60, 65, 70, 75, 80, 85, 90, 95, percent by volume glass. The glass-ceramic may comprise, for example, at least 99, 98, 97, 95, 90, 85, 80, 75, 70, 65, 60, 55, 50, 45, 40, 35, 30, 25, 20, 15, 10, or 5 percent by volume crystalline ceramic.

In another aspect, certain articles made according to the present invention provides a ceramic comprising crystalline ceramic (e.g., at least 1, 2, 3, 5, 10, 15, 20, 25, 30, 35, 40, 45, 50, 55, 60, 65, 70, 75, 80, 85, 90, 95, 97, 98, 99, or even 100 percent by volume crystalline ceramic), the crystalline ceramic comprising, wherein at least 80 (85, 90, 95, 97, 98, 99, or even 100) percent by weight of the crystalline ceramic collectively comprises the REO, $Al_2O_3$, and $ZrO_2$, based on the total weight of the crystalline ceramic. The ceramic may comprise, for example, at least 99, 98, 97, 95, 90, 85, 80, 75, 70, 65, 60, 55, 50, 45, 40, 35, 30, 25, 20, 15, 10, 5, 3, 2, or 1 percent by volume glass.

In another aspect, certain articles made according to the present invention provides a ceramic comprising crystalline ceramic (e.g., at least 1, 2, 3, 5, 10, 15, 20, 25, 30, 35, 40, 45, 50, 55, 60, 65, 70, 75, 80, 85, 90, 95, 97, 98, 99, or even 100 percent by volume crystalline ceramic), the ceramic comprising REO and $Al_2O_3$ and $ZrO_2$, wherein at least 80 (85, 90, 95, 97, 98, 99, or even 100) percent by weight of the ceramic collectively comprises REO, $Al_2O_3$, and $ZrO_2$, based on the total weight of the ceramic. The ceramic may comprise, for example, at least 99, 98, 97, 95, 90, 85, 80, 75, 70, 65, 60, 55, 50, 45, 40, 35, 30, 25, 20, 15, 10, 5, 3, 2, or 1 percent by volume glass.

In another aspect, certain articles made according to the present invention provides a ceramic comprising glass (e.g., at least 5, 10, 15, 20, 25, 30, 35, 40, 45, 50, 55, 60, 65, 70, 75, 80, 85, 90, 95, 97, 98, 99, or even 100 percent by volume glass), the glass comprising REO, $Al_2O_3$, $ZrO_2$, and $SiO_2$ wherein at least 80 (85, 90, 95, 97, 98, 99, or even 100) percent by weight of the glass collectively comprises the REO and $Al_2O_3$ and $ZrO_2$, based on the total weight of the glass.

In another aspect, certain articles made according to the present invention provides glass-ceramic comprising REO, $Al_2O_3$, $ZrO_2$, and $SiO_2$, wherein at least 80 (85, 90, 95, 97, 98, 99, or even 100) percent by weight of the glass-ceramic collectively comprises the REO and $Al_2O_3$ and $ZrO_2$, based on the total weight of the glass-ceramic. The glass-ceramic may comprise, for example, at least 1, 2, 3, 5, 10, 15, 20, 25, 30, 35, 40, 45, 50, 55, 60, 65, 70, 75, 80, 85, 90, or 95 percent by volume glass. The glass-ceramic may comprise, for example, at least 99, 98, 97, 95, 90, 85, 80, 75, 70, 65, 60, 55, 50, 45, 40, 35, 30, 25, 20, 15, 10, or 5 percent by volume crystalline ceramic.

In another aspect, the present invention provides glass-ceramic comprising REO, $Al_2O_3$, $ZrO_2$, and $SiO_2$, wherein the glass-ceramic (a) exhibits a microstructure comprising crystallites having an average crystallite size of less than 1 micrometer (typically, less than 500 nanometers, even less than 300, 200, or 150 nanometers; and in some embodiments, less than 100, 75, 50, 25, or 20 nanometers), and (b) is free of at least one of eutectic microstructure features or a non-cellular microstructure. The glass-ceramic may comprise, for example, at least 1, 2, 3, 5, 10, 15, 20, 25, 30, 35, 40, 45, 50, 55, 60, 65, 70, 75, 80, 85, 90, 95, percent by volume glass. The glass-ceramic may comprise, for example, at least 99, 98, 97, 95, 90, 85, 80, 75, 70, 65, 60, 55, 50, 45, 40, 35, 30, 25, 20, 15, 10, or 5 percent by volume crystalline ceramic.

In another aspect, certain articles made according to the present invention provides a ceramic comprising crystalline ceramic (e.g., at least 1, 2, 3, 5, 10, 15, 20, 25, 30, 35, 40, 45, 50, 55, 60, 65, 70, 75, 80, 85, 90, 95, 97, 98, 99, or even 100 percent by volume crystalline ceramic), the crystalline ceramic comprising, wherein at least 80 (85, 90, 95, 97, 98, 99, or even 100) percent by weight of the crystalline ceramic collectively comprises the REO, $Al_2O_3$, $ZrO_2$, and $SiO_2$, based on the total weight of the crystalline ceramic. The ceramic may comprise, for example, at least 99, 98, 97, 95, 90, 85, 80, 75, 70, 65, 60, 55, 50, 45, 40, 35, 30, 25, 20, 15, 10, 5, 3, 2, or 1 percent by volume glass.

In another aspect, certain articles made according to the present invention provides a ceramic comprising crystalline ceramic (e.g., at least 1, 2, 3, 5, 10, 15, 20, 25, 30, 35, 40, 45, 50, 55, 60, 65, 70, 75, 80, 85, 90, 95, 97, 98, 99, or even 100 percent by volume crystalline ceramic), the ceramic comprising REO and $Al_2O_3$ and $ZrO_2$, wherein at least 80 (85, 90, 95, 97, 98, 99, or even 100) percent by weight of the ceramic collectively comprises REO, $Al_2O_3$, $ZrO_2$, and $SiO_2$, based on the total weight of the ceramic. The ceramic may comprise, for example, at least 99, 98, 97, 95, 90, 85, 80, 75, 70, 65, 60, 55, 50, 45, 40, 35, 30, 25, 20, 15, 10, 5, 3, 2, or 1 percent by volume glass.

Crystalline phases that may be present in ceramics according to the present invention include alumina (e.g., alpha and transition aluminas), BaO, CaO, $Cr_2O_3$, CoO, $Fe_2O_3$, $GeO_2$, $HfO_2$, $Li_2O$, MgO, MnO, NiO, $Na_2O$, $P_2O_5$, REO, $Sc_2O_3$, $SiO_2$, SrO, $TeO_2$, $TiO_2$, $V_2O_3$, $Y_2O_3$, ZnO, $ZrO_2$, "complex metal oxides" (including "complex $Al_2O_3$-metal oxide (e.g., complex $Al_2O_3$-REO)), and combinations thereof.

Additional details regarding ceramics comprising $Al_2O_3$, at least one of REO or $Y_2O_3$, and at least one of $ZrO_2$ or $HfO_2$, including making, using, and properties, can be found in the following disclosures which are incorporated herein by reference: U.S. Ser. Nos. 09/922,527, 09/922,528, and 09/922,530, filed Aug. 2, 2001; U.S. Ser. Nos. 10/211,598, 10/211,630, 10/211,639, 10/211,034, 10/211,640, and 10/211,684, filed Aug. 2, 2002; and U.S. Pat. Nos. 7,101,819 and 7,147,544.

Typically, and desirably, the (true) density, sometimes referred to as specific gravity, of ceramic according to the present invention is typically at least 70% of theoretical density. More desirably, the (true) density of ceramic according to the present invention is at least 75%, 80%, 85%, 90%, 95%, 96%, 97%, 98%, 99%, 99.5% or 100% of theoretical density Examples of articles according of the present invention include kitchenware (e.g., plates), dental brackets, and reinforcing fibers, cutting tool inserts, abrasive materials, and structural components of gas engines, (e.g., valves and bearings). Other articles include those having a protective coating of ceramic on the outer surface of a body or other substrate. Further, for example, ceramic according to the present invention can be used as a matrix material. For example, ceramics according to the present invention can be used as a binder for ceramic materials and the like such as diamond, cubic-BN, $Al_2O_3$, $ZrO_2$, $Si_3N_4$, and SiC. Examples of useful articles comprising such materials include composite substrate coatings, cutting tool inserts abrasive agglomerates, and bonded abrasive articles such as vitrified wheels. The use of ceramics according to the present invention can be used as binders may, for example, increase the modulus, heat resistance, wear resistance, and/or strength of the composite article.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated. Unless otherwise stated, all examples contained no significant amount of $SiO_2$, $B_2O_3$, $P_2O_5$, $GeO_2$, $TeO_2$, $As_2O_3$, $V_2O_5$.

EXAMPLES

Example 1

A polyethylene bottle was charged with 27.5 grams of alumina particles (obtained under the trade designation "APA-0.5" from Condea Vista, Tucson, Ariz.), 22.5 grams of calcium oxide particles (obtained from Alfa Aesar, Ward Hill, Mass.) and 90 grams of isopropyl alcohol. About 200 grams of zirconia milling media (obtained from Tosoh Ceramics, Division of Bound Brook, N.J., under the trade designation "YTZ") were added to the bottle, and the mixture was milled at 120 revolutions per minute (rpm) for 24 hours. After the milling, the milling media were removed and the slurry was poured onto a glass ("PYREX") pan where it was dried using a heat-gun. The dried mixture was ground with a mortar and pestle and screened through a 70-mesh screen (212-micrometer opening size).

After grinding and screening, some of the particles were fed into a hydrogen/oxygen torch flame. The torch used to melt the particles, thereby generating melted glass beads, was a Bethlehem bench burner PM2D model B, obtained from Bethlehem Apparatus Co., Hellertown, Pa., delivering hydrogen and oxygen at the following rates. For the inner ring, the hydrogen flow rate was 8 standard liters per minute (SLPM) and the oxygen flow rate was 3 SLPM. For the outer ring, the hydrogen flow rate was 23 (SLPM) and the oxygen flow rate was 9.8 SLPM. The dried and sized particles were fed directly into the torch flame, where they were melted and transported to an inclined stainless steel surface (approximately 51 centimeters (cm) (20 inches) wide with the slope angle of 45 degrees) with cold water running over (approximately 8 liters/minute) the surface to form beads.

Examples 2-9

Examples 2-9 glass beads were prepared as described in Example 1, except the raw materials and the amounts of raw materials used are listed in Table 1, below, and the milling of the raw materials was carried out in 90 (milliliters) ml of isopropyl alcohol with 200 grams of the zirconia media (obtained from Tosoh Ceramics, Division of Bound Brook, N.J., under the trade designation "YTZ") at 120 rpm for 24 hours. The sources of the raw materials used are listed in Table 2, below.

TABLE 1

| Example | Weight percent of components | Batch amounts, g |
|---------|------------------------------|------------------|
| 2 | CaO: 36 | CaO: 18 |
|   | $Al_2O_3$: 44 | $Al_2O_3$: 22 |
|   | $ZrO_2$: 20 | $ZrO_2$: 10 |
| 3 | $La_2O_3$: 45 | $La_2O_3$: 22.5 |
|   | $TiO_2$: 55 | $TiO_2$: 27.5 |
| 4 | $La_2O_3$: 36 | $La_2O_3$: 18 |
|   | $TiO_2$: 44 | $TiO_2$: 22 |
|   | $ZrO_2$: 20 | $ZrO_2$: 10 |
| 5 | BaO: 47.5 | BaO: 23.75 |
|   | $TiO_2$: 52.5 | $TiO_2$: 26.25 |
| 6 | $La_2O_3$: 48 | $La_2O_3$: 24 |
|   | $Al_2O_3$: 52 | $Al_2O_3$: 26 |
| 7 | $La_2O_3$: 40.9 | $La_2O_3$: 20.45 |
|   | $Al_2O_3$: 40.98 | $Al_2O_3$: 20.49 |
|   | $ZrO_2$: 18.12 | $ZrO_2$: 9.06 |
| 8 | $La_2O_3$: 43 | $La_2O_3$: 21.5 |
|   | $Al_2O_3$: 32 | $Al_2O_3$: 16 |
|   | $ZrO_2$: 12 | $ZrO_2$: 6 |
|   | $SiO_2$: 13 | $SiO_2$: 6.5 |
| 9 | SrO: 22.95 | SrO: 11.47 |
|   | $Al_2O_3$: 62.05 | $Al_2O_3$: 31.25 |
|   | $ZrO_2$: 15 | $ZrO_2$: 7.5 |

TABLE 2

| Raw Material | Source |
|--------------|--------|
| Alumina particles ($Al_2O_3$) | Obtained from Condea Vista, Tucson, AZ under the trade designation "APA-0.5" |
| Calcium oxide particles (CaO) | Obtained from Alfa Aesar, Ward Hill, MA |
| Lanthanum oxide particles ($La_2O_3$) | Obtained from Molycorp Inc., Mountain Pass, CA |
| Silica particles ($SiO_2$) | Obtained from Alfa Aesar |
| Barium oxide particles (BaO) | Obtained from Aldrich Chemical Co. |
| Titanium dioxide particles ($TiO_2$) | Obtained from Kemira Inc., Savannah, GA |
| Strontium oxide particles (SrO) | Obtained from Alfa Aesar |
| Yttria-stabilized zirconium oxide particles (Y-PSZ) | Obtained from Zirconia Sales, Inc. of Marietta, GA under the trade designation "HSY-3" |

Various properties/characteristics of some of Examples 1-9 materials were measured as follows. Powder X-ray diffraction (using an X-ray diffractometer (obtained under the trade designation "PHILLIPS XRG 3100" from PHILLIPS, Mahwah, N.J.) with copper K ⟨1 radiation of 1.54050 Angstrom)) was used to qualitatively measure phases present in example materials. The presence of a broad diffused intensity peak was taken as an indication of the amorphous nature of a material. The existence of both a broad peak and well-defined peaks was taken as an indication of existence of crystalline matter within an amorphous matrix. Phases detected in various examples are reported in Table 3, below.

TABLE 3

| Example | Phases detected via X-ray diffraction | Color | $T_g$, °C. | $T_x$, °C. | Hot-pressing temp., °C. |
|---------|---------------------------------------|-------|------------|------------|-------------------------|
| 1 | Amorphous* | Clear | 850 | 987 | 985 |
| 2 | Amorphous* | Clear | 851 | 977 | 975 |
| 3 | Amorphous* | Clear | 799 | 875 | 880 |
| 4 | Amorphous* | Clear | 821 | 876 | 880 |
| 5 | Amorphous* | Clear | 724 | 760 | 815 |
| 6 | Amorphous* | Clear | 855 | 920 | 970 |
| 7 | Amorphous* | Clear | 839 | 932 | 965 |
| 8 | Amorphous* | Clear | 836 | 1002 | 970 |
| 9 | Amorphous* | Clear | 875 | 934 | 975 |

*glass, as the example has a $T_g$

For differential thermal analysis (DTA), a material was screened to retain glass beads within the 90-125 micrometer size range. DTA runs were made (using an instrument obtained from Netzsch Instruments, Selb, Germany under the trade designation "NETZSCH STA 409 DTA/TGA"). The amount of each screened sample placed in a 100-microliter $Al_2O_3$ sample holder was 400 milligrams. Each sample was heated in static air at a rate of 10° C./minute from room temperature (about 25° C.) to 1200° C.

Referring to FIG. 1, line 345 is the plotted DTA data for the Example 3 material. Referring to FIG. 1 line 345, the material exhibited an endothermic event at a temperature around 799° C., as evidenced by the downward curve of line 345. It was believed that this event was due to the glass transition ($T_g$) of the material. At about 875° C., an exothermic event was observed as evidenced by the sharp peak in line 345. It was believed that this event was due to the crystallization ($T_x$) of the material. These $T_g$ and $T_x$ values for other examples are reported in Table 3, above.

FIGS. 2-6 are the plotted DTA data for Examples 2, 5, 6, 7, and 9, respectively.

For each of Examples 1-9, about 25 grams of the glass beads were placed in a graphite die and hot-pressed using uniaxial pressing apparatus (obtained under the trade designation "HP-50", Thermal Technology Inc., Brea, Calif.). The hot-pressing was carried out in an argon atmosphere and 13.8 megapascals (MPa) (2000 pounds per square inch (2 ksi)) pressure. The hot-pressing temperature at which appreciable glass flow occurred, as indicated by the displacement control unit of the hot pressing equipment described above, are reported for Examples 1-9 in Table 3, above.

Various modifications and alterations of this invention will become apparent to those skilled in the art without departing from the scope and spirit of this invention, and it should be understood that this invention is not to be unduly limited to the illustrative embodiments set forth herein.

What is claimed is:
1. A ceramic comprising:
   a glass comprising at least 80% by weight of $TiO_2$ and $La_2O_3$;
   less than 20% by weight $SiO_2$;
   less than 5% by weight $B_2O_3$; and
   less than 20% by weight $P_2O_5$;
   the glass having a glass transition temperature, $T_g$, and a crystallization onset temperature, $T_x$, and the difference between $T_g$ and $T_x$ is at least 35K.
2. The ceramic of claim 1, comprising a glass-ceramic, the glass-ceramic comprising crystals of the glass, wherein at least 80% by weight of the glass-ceramic comprises $TiO_2$ and $La_2O_3$.
3. The ceramic of claim 1, comprising less than 10% by weight $SiO_2$.
4. The ceramic of claim 1, comprising less than 5% by weight $P_2O_5$.

5. The ceramic of claim 1, comprising a glass wherein less than 40% by weight of the glass collectively comprises $SiO_2$, $B_2O_3$, and $P_2O_5$.

6. The ceramic of claim 1, further comprising an additional metal oxide selected from the group consisting of $Al_2O_3$, BaO, CaO, $Cr_2O_3$, CoO, $Fe_2O_3$, $GeO_2$, $HfO_2$, $Li_2O$, MgO, MnO, NiO, $Na_2O$, $P_2O_5$, $CeO_2$, $Dy_2O_3$, $Er_2O_3$, $Eu_2O_3$, $Gd_2O_3$, $Ho_2O_3$, $Lu_2O_3$, $Nd_2O_3$, $Pr_6O_{11}$, $Sm_2O_3$, $Th_4O_7$, $Tm_2O_3$, $Yb_2O_3$, $SO_2O_3$, $SiO_2$, SrO, $TeO_2$, $TiO_2$, $V_2O_3$, $Y_2O_3$, ZnO, $ZrO_2$, and combinations thereof.

7. The ceramic of claim 6, the additional metal oxide comprising $ZrO_2$.

8. The ceramic of claim 1, in a form comprising particles, beads, microspheres, or fibers.

* * * * *